United States Patent [19]

Heffner, III

[11] Patent Number: 5,130,983
[45] Date of Patent: Jul. 14, 1992

[54] METHOD OF POLLING TO DETERMINE SERVICE NEEDS AND THE LIKE

[76] Inventor: Horace W. Heffner, III, P.O. Box 325, Palmer, Ak. 99645

[21] Appl. No.: 499,971

[22] Filed: Mar. 27, 1990

[51] Int. Cl.$^5$ ............................................. H04J 3/02
[52] U.S. Cl. ..................... 370/85.8; 370/85.6; 370/94.3; 340/825.08; 340/825.02; 395/725
[58] Field of Search ............ 370/85.6, 85.4, 85.8, 370/108, 94.3, 104.1, 95.2, 60, 94.1, 85.3, 85.4, 85.1; 340/825.08, 825.02, 825.5, 825.51, 825.52, 825.05, 825.54, 505, 518; 395/158, 148, 725, 275

[56] References Cited

U.S. PATENT DOCUMENTS

| | | | |
|---|---|---|---|
| 3,795,895 | 3/1974 | Dillingham | 340/163 R |
| 4,038,641 | 7/1977 | Bouknocht | 364/900 |
| 4,071,908 | 1/1978 | Brophy | 364/900 |
| 4,088,983 | 5/1978 | Crandall | 340/147 R |
| 4,100,533 | 7/1978 | Napolitano | 340/147 R |
| 4,149,144 | 4/1979 | Diefenderfer | 340/147 R |
| 4,151,370 | 4/1979 | Root | 179/2 A S |
| 4,365,267 | 12/1982 | Tsuda | 358/84 |
| 4,377,870 | 3/1983 | Anderson | 455/2 |
| 4,385,314 | 5/1983 | Yashiro | 358/84 |
| 4,411,007 | 10/1983 | Rodman | 375/107 |
| 4,454,508 | 6/1984 | Grow | 340/825.05 |
| 4,466,001 | 8/1984 | Moore | 340/825.08 |
| 4,475,121 | 10/1984 | Yashiro | 358/84 |
| 4,569,044 | 2/1986 | Tao | 370/85 |
| 4,577,184 | 3/1986 | Hodara | 340/566 |
| 4,595,921 | 6/1986 | Wang | 340/825.08 |
| 4,598,363 | 7/1986 | Clark | 364/200 |
| 4,638,428 | 1/1987 | Gemma | 364/200 |
| 4,667,193 | 5/1987 | Cotie | 340/825.08 |
| 4,670,872 | 6/1987 | Cordill | 370/85 |
| 4,672,604 | 6/1987 | Bhatia | 370/58 |
| 4,742,335 | 5/1988 | Vogt | 340/518 |
| 4,763,323 | 8/1988 | Nelson et al. | 340/825.5 |
| 4,773,005 | 9/1988 | Sullivan | 364/200 |
| 4,811,338 | 3/1989 | Haruyama | 370/85 |
| 4,829,297 | 5/1989 | Ilg et al. | 370/85.8 |
| 4,866,702 | 9/1989 | Shimizu et al. | 370/60 |
| 4,868,816 | 9/1989 | Katsumata | 370/95.2 |
| 4,872,159 | 10/1989 | Hemmady et al. | 370/85.6 |
| 4,933,936 | 6/1990 | Rasmussen et al. | 340/825.5 |
| 5,010,329 | 4/1991 | Nagakura | 370/85.8 |

Primary Examiner—Douglas W. Olms
Assistant Examiner—Dang Ton

[57] ABSTRACT

Tis method provides high utilization collision free access to a digital pulse communications medium with priority provided by message class and/or terminal type, regardless of network topology. This is accomplished by utilizing a controller which broadcasts a series of polling frames to all terminals, the response to each of which is a single bit (pulse) from any terminal remaining eligible to respond. All responses to a poll are logically OR'ed by the network to provide a combined response frame at the controller, thus making the process ambivalent to collisions. A polling frame and associated response frame, called a polling cycle, determines one digit of a selected address. A terminal not selected in a given cycle is blocked from responding further, until its high order digit(s) are again selected. Each polling cycle is therefore context sensitive, thus maximizing the information flow per poll and minimizing data flow and network travel time per terminal selection. Each polling frame specifies the value of the address digit being tested, thereby giving the controller complete control of priority of network addresses to receive service. To provide priority by message class, the additional message class bits are prefixed to each terminal address, providing a unique address for each terminal/message class combination. Each terminal is then free to modify the prefix of its own address to specify message priority.

18 Claims, 15 Drawing Sheets

METHOD OF POLLING TO DETERMINE SERVICE NEEDS AND THE LIKE

This invention is related to polling schemes and more particularly to polling schemes having single bit response patterns.

BACKGROUND OF THE INVENTION

Computer systems have long relied on communications between a control processor and remote terminals. More recently, communications also occur directly from terminal to terminal via a shared medium. In complex systems such as these, access to the medium must be carefully controlled to ensure not only that the system remains functional, but that it operates efficiently. Several methods have been developed to determine if terminals desire access to the medium and in what priority communication will be granted. Examples of typical methods are found in industry publications 802.5-1985 LANs: Token Ring Access (ANSI/IEEE); 802.4-1985 LANs:Token-Passing Bus (ANSI/EEE); 802.3-1985 LANs:CMSA-CD (ANSI/IEEE). U.S. Pat. Nos. include 4,672,604, 4,670,872, 4,667,193, 4,638,428, 4,598,363, 4,595,921, 4,577,184, 4,569,044, 4,475,121, 4,466,001, 4,454,508, 4,411,007, 4,385,314, 4,377,870, 4,365,267, 4,151,370, 4,149,144, 4,100,533, 4,088,983, 4,071,908, 4,038,641 and 3,795,895. Some of the methods discussed in these references only permit one terminal at a time to attempt access to the medium. Examples of this type of method are the token ring and token bus systems in which an electronic token is passed through the system, terminal by terminal, to determine communication status. If the terminal that possesses the token wishes to transmit, it is entitled to do so while all other terminals wait. If the terminal has nothing to transmit at that time, it passes the token to the next terminal. Although this permits a high degree of medium utilization when traffic is heavy, it is inefficient under light loading because the token must be passed through many terminals without carrying a message. If message type priorites are desired, the token must pass through all of the terminals without encountering a high priority request before a secondary priority transmission can begin, thereby incurring transmission delays (ref. U.S. Pat. No. 4,545,508 to Grow). Token ring is a form of loop communications because the terminals are connected together in a loop that permits the token to pass from terminal to terminal.

Another solution to communications medium control is typically called tree polling, branch polling, or probing. Here, a controller sends a message to a group of terminals located either logically (by address) or physically (in a tree topology network) along a particular branch of the network. Every service requesting terminal that is in the selected branch responds to the controller. The controller can manage network priorities through control of the set of terminals tested by each choice of branch. The advantage of this system is that it allows the controller to determine quickly the extent of service needed from a large group of terminals at one time. The drawback of this type of polling is collisions. A collison occurs when two or more signals from terminals arrive simultaneously at the controller. When this occurs, the resulting message is usually garbled. One method of resolving collisions is to reduce the branch size and poll again. This branch reduction process continues until no collisions occur, which is assured because the smallest branch size includes only one terminal. In a heavily loaded network, branch polling is far less effective than even a simple round robin polling scheme, because multiple polls plus collision detection overhead are required to select a single terminal. Adaptive polling or probing techniques have been developed to adapt to heavy or light conditions, such as that described in U.S. Pat. No. 4,071,908 to Brophy et. al. However, these methods still involve the inefficiency of multiple polling sequences, each sending polling words that contain entire addresses and other data to select a single terminal.

Another method for avoiding collisions is disclosed in U.S. Pat. No. 4,595,921 to Wang et. al., which spaces the terminals at a unique distance from the controller. Since each terminal is at a unique distance, the signals from them can never arrive at the same time. This method works for small numbers of terminals in close proximity, but becomes unwieldy for greater distances and terminal counts.

Another methodology that experiences collision problems is Carrier Sense Multiple Access with Collision Detection (CSMA/CD) and similar methods in which terminals desiring access to the medium simply attempt, upon demand, to transmit a message to the desired recipient. This method is vulnerable to saturation problems in the same manner that branch polling is.

The common method of dealing with collisions in either branch polling or CSMA/CD type schemes is called "collision detection and avoidance". In this scheme, if a collision is detected, i.e. a garbled message is received because of overlapping bit streams, the terminals retransmit after a random time delay. The theory is that the two or three colliding terminals will retransmit at different times, thereby avoiding a collision. While this method will work when systems are lightly loaded, collisions increase as the communications traffic builds. Even with the time delays, collision will increase until saturation occurs and all communication breaks down because every message results in a collision and all communication halts. Currently, many communications networks experience difficulties with collision saturation, especially those having high message volume devices like file servers.

In addition to the above problems, the methods that require specific topologies such as bus, star or ring, are not applicable to open area control situations, such as management of infrared wall bounce systems, or control of mobile terminals. Ring or tree topology networks also have the drawback that transmission delays, due to the requirement to store portions of or complete messages prior to passing them on, are introduced in each active branching node.

BRIEF DESCRIPTION OF THE INVENTION

The object of the present method is to overcome these difficulties by providing a system which is network topology independent, and which allows for efficient branch polling while avoiding problems with collisions. An additional object is to provide for message priorities by message type and/or terminal class. As applied to tree topology networks, a further object to avoid multi-bit delays at each branch, while providing for automatic fault location and network topology determination. These objectives are achieved by using a polling technique called *Bit At a Time* (BAT). The method consists of performing a sequence of polling cycles, the result of which is the selection of a terminal to receive service, or determination that no terminal needs service. Each polling sequence consists of a polling sequence header to indicate to all terminals that a polling sequence is in progress, followed by a sequence of polling cycles. When the polling sequence header is sent, any terminal requesting access to the transmission medium is marked eligible. Each polling cycle consists of a polling frame, followed by a response window. A polling frame contains a start bit, a "feedback" bit, and a "test for" bit. In each cycle the controller sends the polling frame, then looks for one or more observable response bits, which are logically summed (OR'd together) to make a single response bit, during the response window. The response window is of duration equal to the largest possible sum including message travel time to, response time of and return time from any terminal, plus the maximum duration of the response bit. Each polling cycle tests a single bit in a multi-bit address. After receiving and processing the poll frame, every terminal remaining eligible compares the "test for" bit with the appropriate bit in its address. If an eligible terminal does not have the "test for" bit, the terminal remains silent, otherwise, it sends a one bit pulse to the controller in reply. Every eligible terminal that has a matching bit sends a one bit pulse. Because the controller is only looking for a one bit pulse during the response window, the impact of collisions, i.e., multiple one bit pulses transmitted from several terminals, becomes immaterial.

Following a polling cycle, the controller determines the selected value for the address bit tested, and sends this value as the "feedback bit" of the subsequent poll frame. If any terminal responded in the current polling cycle, the selected value is the "test for" value of the current polling cycle, otherwise it is the opposite value. A terminal matches the poll if either the corresponding binary digit of it's address matches the "test for" bit, or no terminal responds to the poll. This is determined at the terminal, while processing the subsequent polling frame, by comparing the feedback bit in that frame with the terminal's corresponding address bit. If a terminal does not match the poll, it is immediately marked ineligible, and therefore blocked from responding further. Thus, as each polling cycle is performed, fewer and fewer terminals are left to respond until after a maximum of k+1 polling cycles for a k bit address space, the controller has identified the terminal to be serviced (which also "knows" it is selected) or has determined that no terminal needs service. The feedback bit in the first polling cycle, and the "test for" bit in the final polling cycle, can be arbitrary in value or eliminated. A terminal's response bit in the final polling cycle is one if the terminal is still eligible, zero otherwise. This confirms to the controller that some terminal requests service.

Once a terminal has been selected, it can be either downloaded to a different channel for transmitting a message, or can directly transmit its message on the same channel. After the polling medium is free, the controller can once again begin polling.

The priority of addresses in the selection process is totally controlled by the "test for" bits in the polling frames. The poll frame of each polling cycle specifies the value of the address bit being tested, thereby providing the controlling complete control of priority of network addresses to receive service. To provide priority by message class, the additional message class bits are prefixed to the terminal address, providing a unique address for each terminal/message class combination. To specify message priority, each terminal is then free to modify the redundant prefix of its own address. This redundant prefix can be any required length to specify message class or terminal class or any combination of selection criteria.

In a medium where every terminal can sense the response of every other terminal a feedback bit is not required, because each terminal can obtain it during the response window. If this is the case, a polling sequence, even without benefit of the confirmation cycle, produces a selected terminal, that knows it is selected by looking at the responses during the polling sequence. That terminal is then allowed to transmit. If no terminal responds to any of the polling cycles, it indicates that the correct address is the reverse of the address polled, i.e. if the address 10011010 is sent as the sequence of "test for" bits, and no terminals respond, the terminal at address 01100101, the exact complement of the sent address, is then free to transmit.

A broader application of this method is a method called *Digit At a Time* or (DAT). In this method, one digit at a time of the network address space is polled, as in the BAT method, with the polling cycles initiated by transmission of a polling sequence header. However, the digits are not necessarily radix 2, but can be any radix. The controller polls all terminals as in the BAT method. However, the controller determines the digit values being responded by the time delay of the responses. Terminals are calibrated so they can add a delay to any response that results in the response pulse returning in a desired response window. This places each response into a response class. There is one response class window for each possible value of a digit. For example, if the network addresses are expressed radix 8, there are 8 response class windows. All responses in a particular response class window are logically summed (OR'd together), as with the BAT method. This allows the controller to determine which values of the digit of the network address beign tested belong to terminals requesting service, and it polls using only those values as the selected prefix digits for subsequent polls at the next lower level. Unlike the BAT method, if any terminal in the network requests service at the start of the polling cycle, it is certain that there will be a positive response to every poll. As with the BAT polling method only terminals that are eligible, based on higher order digit poll results, can respond to a lower level polling cycle. Each poll is therefore context sensitive, thus maximizing the information flow per poll and minimizing data flow and network travel time per terminal selection. The information flow per poll is further enhanced by including the digit position in the poll frame. This permits moving both up and down the branch selection tree, thereby avoiding reinterogation of every digit of a prefix before giving another terminal service. After a poll at the lowest level (least significant address digit), each positive response uniquely identifies a terminal requesting service. Utilization of this principle in a heavily loaded network can result in the selection of terminals for service with an average of less than three bits of polling channel information per terminal selected. A selected terminal can then be directly notified by address on a higher speed data channel that it has access to some channel.

When applied in a tree topology medium, both the BAT and DAT methods are ideally adapted to employment of amplification, filtering, and network diagnostic techniques without adversely affecting response times or priority management. This is achieved by the employment of network addressable filter nodes (NAFs) at selected branch points. These nodes employ simple pulse amplification on input from the controller (downstream) side followed by distribution to multiple (upstream) output branches, while performing a simple OR'ing of input upstream branch pulses and pulse amplification on output of the OR'ed result toward the controller downstream. When directly requested by message from the controller, or at power on, a server in a NAF listens for and responds to polling sequences from downstream like any other node, OR'ing its response pulses with the incoming upstream pulses to produce the downstream output. When selected by a polling sequence, a NAF responds with a message indicating its status to the controller. When directly addressed with a message from a controller, a NAF can be requested to filter all upstream messages and polling responses, or to resume pass-through. A NAF can be directly addressed to go into or out of a loopback mode, where all messages coming from downstream are immediately routed back downstream to aid the controller in testing the effects of various bit streams when performing network diagnostics. At power on, a NAF does not pass-through, so that the control unit can determine the network topology by successively turning on NAFs and then polling for additional terminals or NAFs upstream.

Further objects and advantages of the invention will become apparent from a consideration of the drawings and ensuing description of the method.

DETAILED DESCRIPTION OF THE INVENTION

Figure 1:
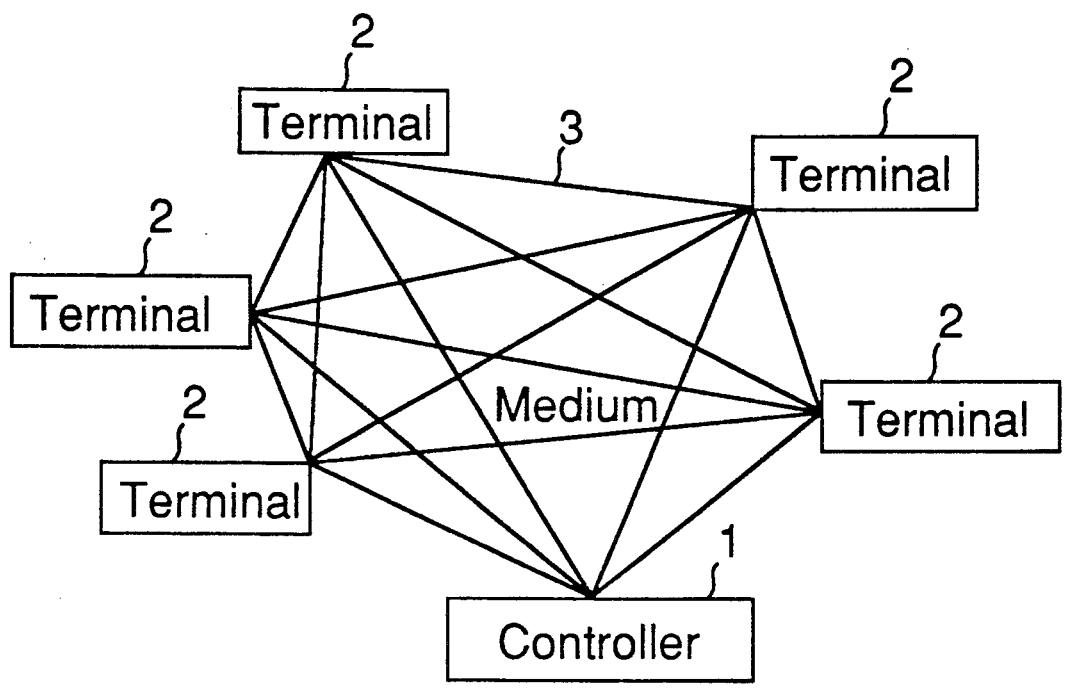
FIG. 1 is a block diagram of a typical topology-free polled system structure.
Figure 2:
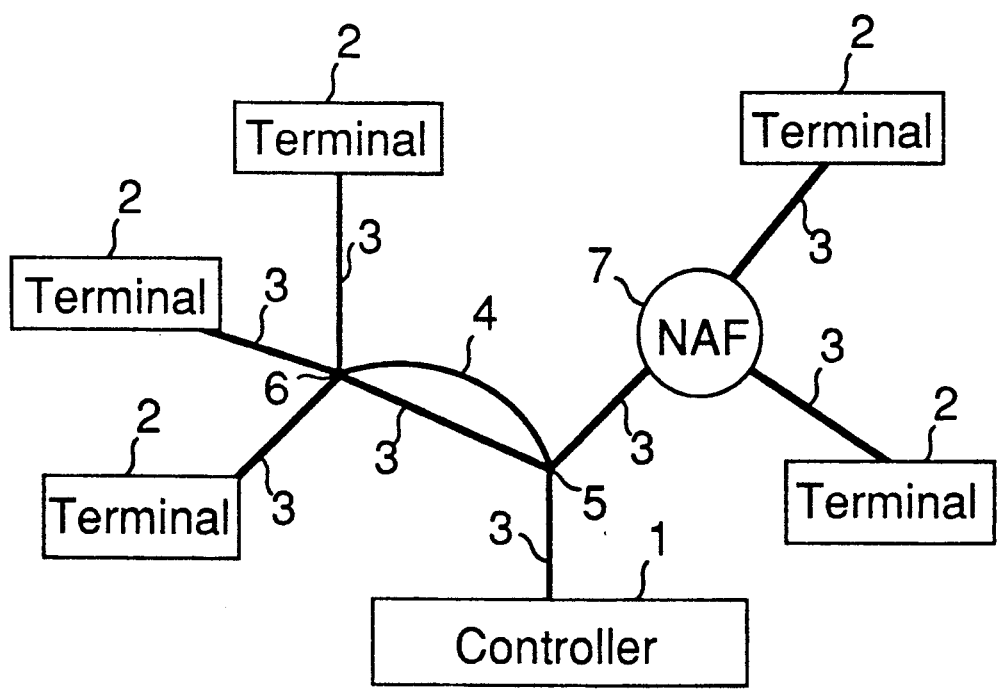
FIG. 2 is a block diagram of a typical polled tree network with parallel redundancy.

Referring now to the drawings, and particularly to FIGS. 1, 2, 3, and 4, a controller device (base station) 1 is connected to remote terminals 2, by a network that uses a digital pulse transmission medium 3, to communicate between the controller 1 and the terminals 2. The medium can include any combination of broadband, base band, or other metallic cables, fiber optic cables, digital switch networks, modulated coherent or incoherent light, or radio waves; including multiplexed and multi-channel variations of the above. A pulse in the medium can be represented in a multiplicity of ways, including simple electrical or other energy form pulses, phase shifts, zero crosses, multiple redundant pulses, complete messages with redundancy codes, encrypted messages, etc. The only requirement of the medium for the present method is that a response bit must be receivable within a known and useful limit of duration from the poll, and that response pulses are logically OR'd when colliding. The ways of transmitting pulses (bits) of information within these requirements are extensive and beyond the scope of this patent, but are readily available to one practiced in the art. Using the present method, poll response times can be highly variable within the limit, permitting applications such as mobile terminals, or wall-bounce systems where pulses decay in erratic ways. This permits topology-free configurations, as shown in FIG. 1, and tree topology configurations as shown in FIG. 2. Note that cabling redundancy, as shown in fIG. 2 by the curved arc 4 redundantly connecting two nodes 5 and 6, is possible provided travel times on all parallel routes are identical and signal looping is prevented. If it is desirable to provide very high redundancy, or prevent active intrusion, parallel routes may be joined at a node through a relatively simple circuit which permits each route to vote on each pulse-majority winning.

Figure 3:
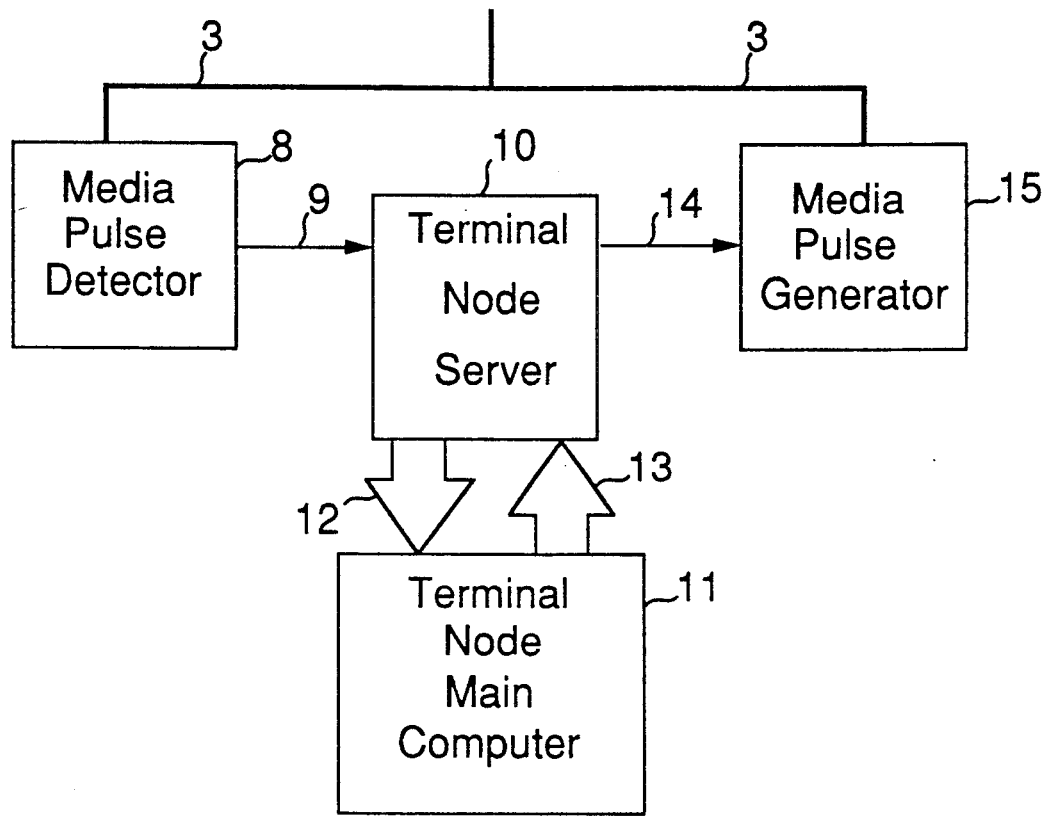
FIG. 3 is a block diagram of the network to terminal interface for DAT or BAT polling.

The structure of a terminal node 2 is shown in FIG. 3. A terminal node 2 consists of a media pulse detector (MPD) 8 which converts a pulse from the media 3 to a simple digital electrical pulse output at 9 for input to a terminal node server (TNS) 10. The TNS 10 contains the addressw of thye terminal 2, and iflters out messages not addressed to the terminal node main computer (TNMC) 11, and when data is to be sent responds directly to polling messages from the controller 1. When messages arrive from the network addressed to the TNMC 11, they are passed to the TNMC 11 via interface 12. When access to the media is requested, the TNMC 11 outputs data an a destination network address to the TNS 10 via interface 13. When access to the media is granted, or when responding to a poll from the controller 1, digital pulses are sent by the TNS 10 via interface 14 to a media pulse generator (MPG) 158 for transmission through the medium 3.

Figure 4:
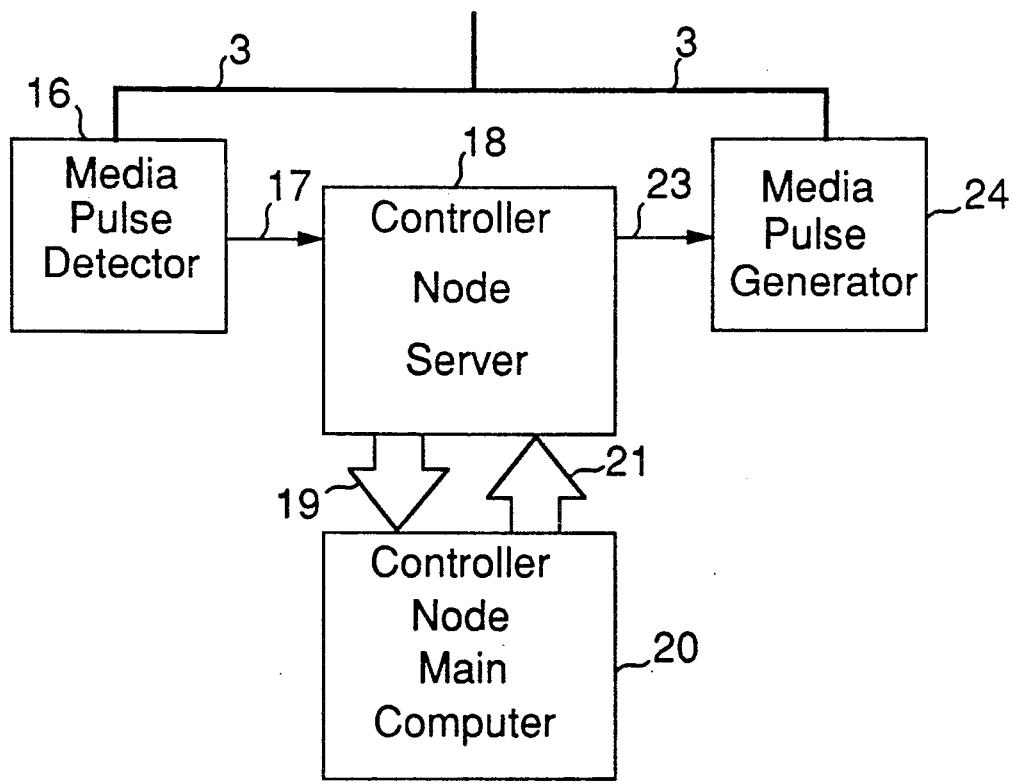
FIG. 4 is a block diagram of the controller to network interface for DAT or BAT polling.

Referring to FIG. 4, we see a controller node 1 consists of MPD 16 which converts a pulse from the media 3 to a simple electric digital pulse and sends it via interface 17 to the controller node server (CNS) 18. Each message (excluding polling responses) is passed through the CNS 18 via interface 19 to the CNMC 20. The CNMC 20 sends messages to the CNS 18 vai interface 21. Messages and polling frames are sent via interface 23 to the MPG 24 which sends the corresponding pulses through the medium 3. In the event every terminal 2 cannot see messages sent directly by every other termina, a controller node main computer (CNMC) 20 is required to perform message switching functions, i.e. receive and retransmit every message addressed from on terminal to another. The CNMC 20 can be employed for message queuing and for routing functions when multiple channel media are employed. The CNMC 20 performs sign-on functions, monitors network performance, and diagnoses error conditions. Performing message queuing at the CNMC 20 permits monitoring of server queues, and distribution of work across redundant servers through use of a destination address alias list in the CNMC 20. Multiple controller node servers can be utilized from a single CNMC 20, resulting in multiple sets of independent sub-networks with separate polling.

In the event calibration sessions are required by the media used, the CNS 18 must contain a timer circuit that can measure the time interval between the sending of a start or synchronization pulse and the return of a pluse through the medium 3. The CNS 18 must be capable of returning the time obtained to the CNMC 20, so correcting delay values may be sent to the terminal being calibrated.

Terminal and message priority is controlled by dynamically changing the network address stored in the TNS 10 of terminals, and by managing the values tested for by the CNS 18 in the polling sequence. The CNS 18 contains two arrays of one-bit values, which are loaded and changed as requred by the CNMC 20, that control the values tested in the polling sequence, and therefore, in a manner to be described, the priority with which addresses are selected.

It is recommended that each terminal be assigned at manufacture a unique absolute address for use in sign-on and error management. This address, however, could be assigned through other means such as the use of switches, values stored in data accessed by the TNMC 11, or established at random through a sign-on protocol between the CNMC 20 and the TNMC 11.

Following initial sign-on, the TNS 10 must have stored in it a network address, the low order portion of which must be unique network wide. This network address can be much smaller than the absolute address used for sign-on, which should be large enought to be unique universally. The high order portion of the address in the TNS 10 may be changed at the time a message send request is presented to the TNS 10 may be changed at the time a message send request is presented to the TNS 10 via interface 13, thereby providing priority by message type. The management of terminal and message type priorities is discussed in detail below, especially in reference to FIGS. 13 and 14.

Tree topology networks should be implemented with network addressable filters (NAF$_s$) 7 throughout the network, especially at ends of long or error prone links. The simplicity of the present polling method, and the OR'ing requirement of the media 3, permit the use of a relatively inexpensive device to provide amplification, filtering, and network diagnostic capabilities, without adversely affecting response time.

Figure 5:
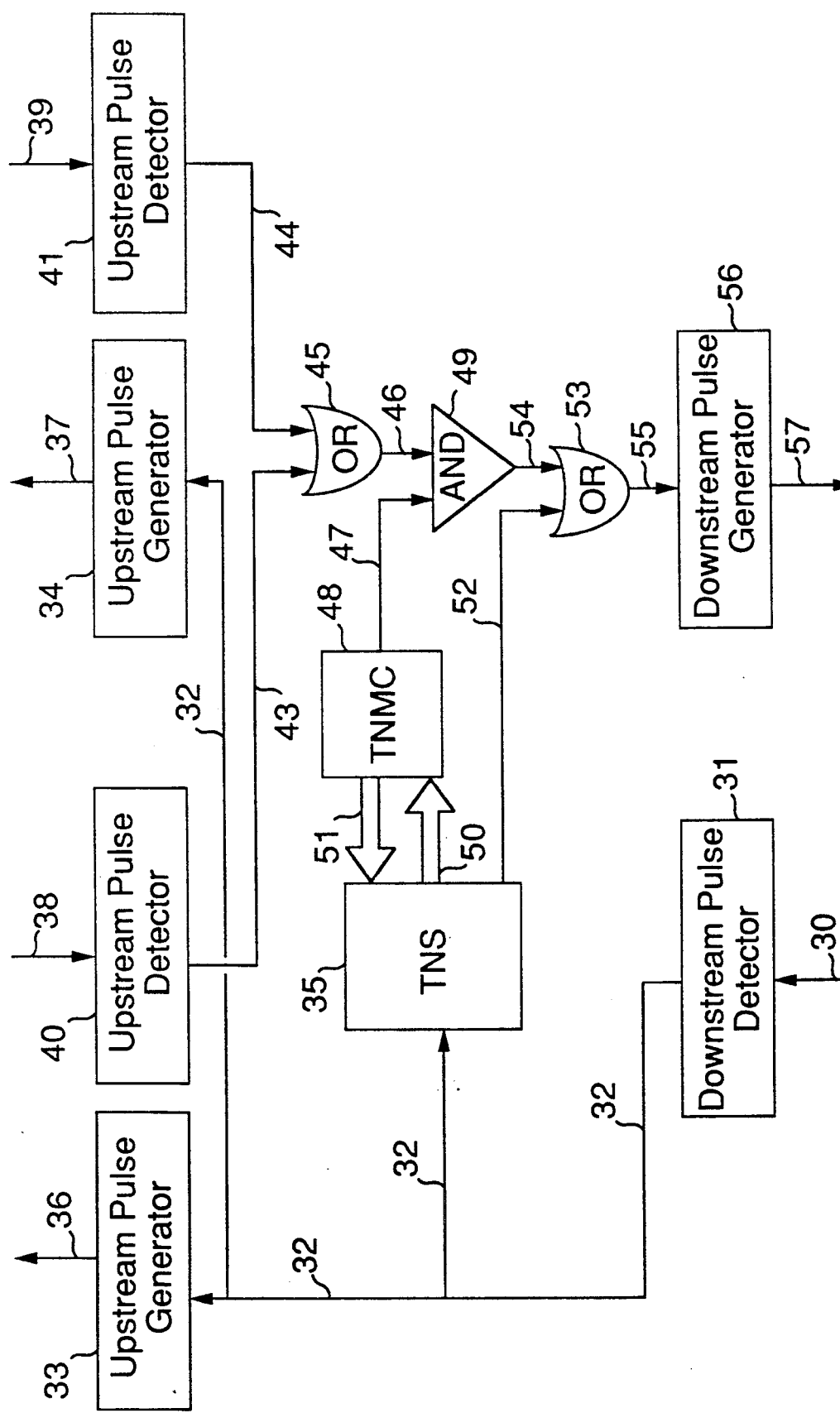
FIG. 5 is a block diagram of a network addressable filter.

Referring now to FIG. 5, we see a configuration of a NAF7 as applied in a full duplex environment such as a tree topology fiber optic system. Pulses arriving from the downstream (from the controller) input 30 are converted to an electronic digital pulse by the downstream pulse detector 31, and distributed via interface 32 to the two (or more) upstream pulse generators 33 and 34, as well as the NAF's own terminal node server 35. The upstream (away from the controller) pulse generators 33 and 34 then propagate to the upstream outgoing branches 36 and 37 the pulses corresponding to the messages and polls arriving at the downstream input 30. Pulses coming from the two (or more) upstream input branches 38 and 39 either simultaneously or separately are converted to electronic digital pulses by upstream pulse detectors 40 and 41 for output at 43 and 44 to the OR gate 45. The output 46 of the OR gate 45 and an output 47 from the NAF's TNMC 48 are input to the AND gate 49, which is used to stop all upstream input from going downstream when output 47 is low. Downstream input messages addressed to the NAF are passed by the TNS 35 via interface 50 to the TNMC 48, which can respond by sending messages addressed to the controller via interface 51 to the TNS 35, or by changing the output 47 to high to allow upstream messages to pass through, or low to filter them. Messages and poll response pulse from the TNS 35 are output via 52 to OR gate 53, where they are OR'ed with the upstream input that passes through the filter gate 49. The combined output 55 or OR gate 53 is sent downstream by media pulse generator 56 through media output 57.

Note that the gates 45, 49, and 53 should be simple unclocked gates. No closkc synchronization is required. Clock synchronization may be required at inputs 32, 9, and 17 to node servers.

Note that if NAF's are used in each branch of a tree network, phase cancellation problems are avoided totally, because pure digital pulses from both upstream inputs 43 and 44 are combined before conversion back to media form by media pulse generator 56 for output downstream, and this is achieved without a multi-bit delay. It is only possible to achieve this without delay because the poll responses are a signle bit, wherein lies the chief strength of this method.

If only medium conversion or simple distribution and amplification are required, components 35, 50, 51, 47, 49, 54, 53, and 55 can be eliminated, and OR gate output 46 connected directly to downstream pulse generator 57.

To improve fault isolation capabilities at the cost of some additional complication, output 47 and AND gate 49 could be duplicated and moved prior to OR gate 45 to individually control the flow from upstream outputs 43 and 44, etc.

When applied in an open area, application, the media inputs and outputs 30, 57, 36, 38, 37, and 39 can represent different local channels, or inputs and outputs from different radio cells, or from different directions if a directional media such as microwave or laser beam is used, which are to be combined into a single channel represented by input 30 and output 57. The primary purpose of a NAF can be medium conversion, such as optical fiber to twisted pair.

When used in an end-to-end multi-channel medium, such as broadband, all components except the NAF TNMC 48 must be duplicated for each channel controlled by the NAF, so that each channel is processed in parallel.

The ways of providing for redundancy, sign-on sessions, unique address assignment, calibration sessions, performance monitoring, communication error diagnosis, message queuing, and clock synchronization are extensive and beyond the scope of this patent, but are readily available to one practiced in the art. They are discussed here to demonstrate how they apply to the present method, and to discuss advantages and disadvantages of different ways of applying the method. The scope of this patent is limited to the method used for polling and responding to polls and the dynamic modification of addresses to achieve fast, collision free, priority based selection of terminals for access to the network, while providing for the requirements of open area and tree topology networks.

A terminal 2 must be abel to obtain unique access to the medium 3 when that terminal has a message to be transmitted to another terminal. The controller 1, using a predetermined sequencing, discussing in greater detail below, sends out polling messages 59 to the terminals 2. Refering to FIG. 6, these polling messages 59 are grouped into sequences which consist of a polling sequence header (PSH) 60 followed by a series of polling cycles 61. Each polling cycle 81 begins with a poll frame 75 from the controller node, and ends with a response window 79 during which terminals respond to the preceding poll frame 75. A PSH 60 is sent to all terminals 2 to initiate the polling sequence 59. Any terminal not requesting service at the time it receives the PSH 60 is excluded from responding at all during the current polling sequence 59. The PSH 60 can be sent on the same channel polling cycles 61 are sent one, or on a different channel. The sample PSH 60 shown in FIG. 6 begins with a start bit 62, a two bit poll indicator code 63 to alert the terminals that this message is a PSH 60, and other data 64. The number, type and contents of frames in a PSH 60 can be highly varied, depending on the implementation. The critical information carried by the PSH 60 is simply that the sequence 59 has begun. This can also be achieved by modification of the first polling frame in some manner, such as elongation of the start bit or the addition of a bit. Terminals that enter the network, or suddenly require service after the sequence 59 begins, must wait for another polling sequence 59 to obtain service. The PSH 60 is followed by a number of polling cycles 61 that determine the address of the terminal selected by the sequence 59, and finally by a quiet period 74 required after (or before) every message.

Figure 7:
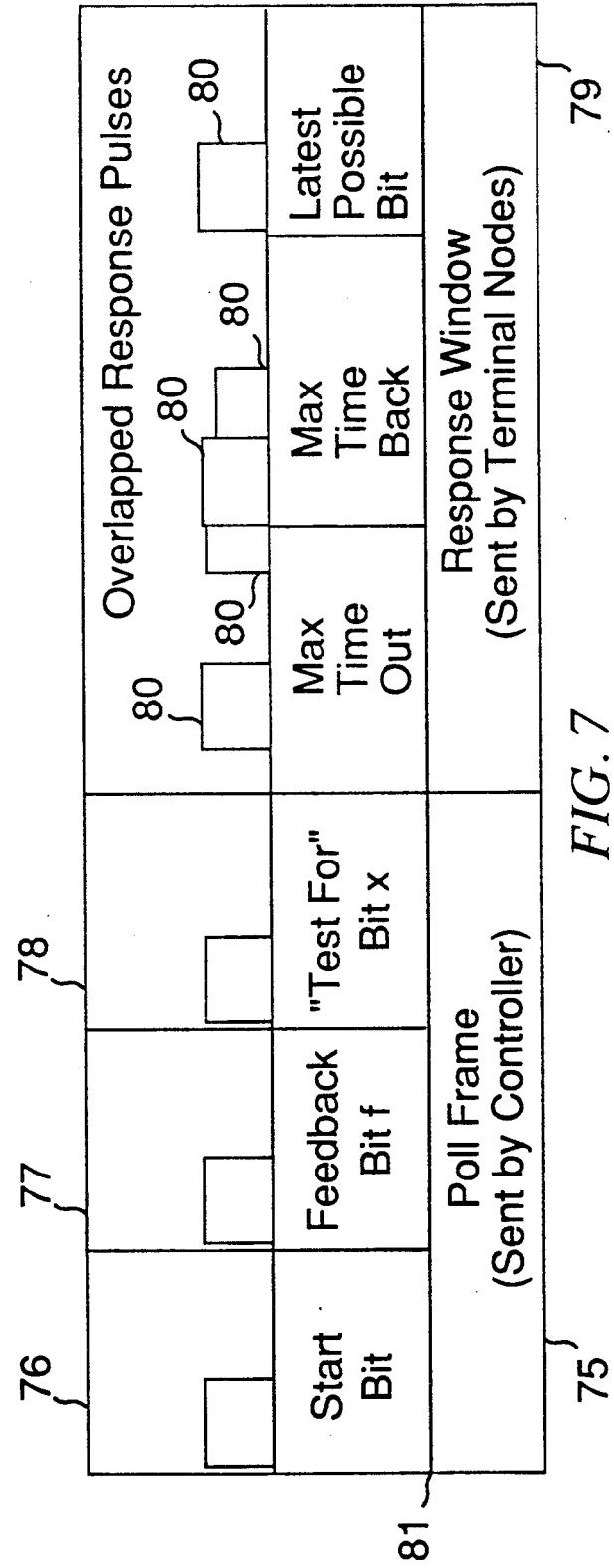
FIG. 7 is a diagram showing the time response in a BAT polling cycle.

In the first embodiment of the invention, called "Bit at a Time" or BAT polling, during each polling cycle 81 of the polling sequence 59 the controller 1 sends out a poll frame 75, shown in FIG. 7, consisting of a start bit 76, a "feedback" bit f 77, and a "test for" bit x 78. The "test for" bit x 78 (a 1 or a 0) is the preferred value of a particular digit in the binary address of any prospective terminals 2 to receive service. If a receiving terminal 2 which is still eligible to respond has in the tested digit of its address a bit that matches x 78, the terminal will send an acknowledgement bit 80. If the terminal 2 does not match x 78, or is otherwise ineligible, it will remain silent.

Figure 6:
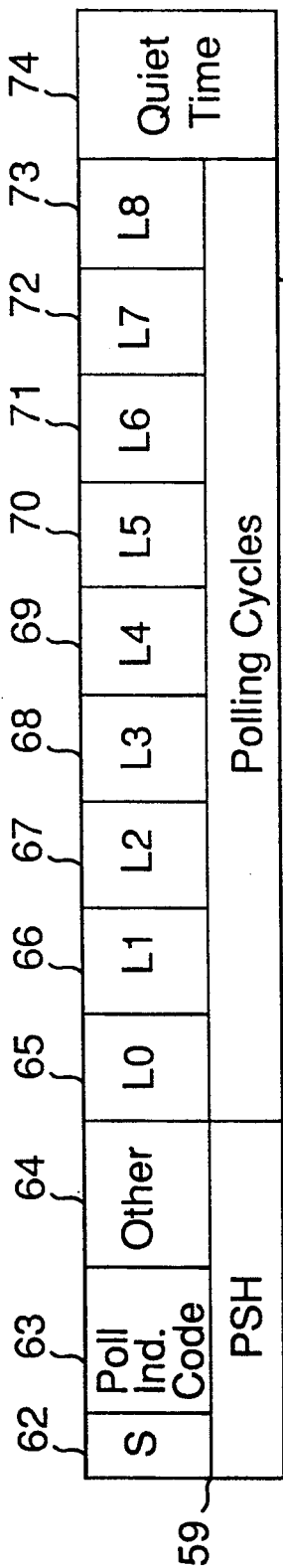
FIG. 6 is a diagrammatic display of the polling sequence used in BAT polling.

FIG. 6 shows a typical polling sequence that can be used in various networks below other higher level protocols. For example, a typical network may have four different types of messages, i.e. polls, data messages, acknowledgements and broadcasts. Every message sequence sent through the medium, including the PSH 60, starts with a message header 61 consisting of a start bit 62, a two bit message type indicator code 63 (indicating a poll, data messages, acknowledgement or broadcast) and the message frame or frames. In this example, the message frames consist of polling cycles 65–73.

FIG. 7 shows an expanded polling cycle 81 showing the poll frame 75 (on the left marked sent by controller) and the response window 79 (on the right marked sent by terminal nodes). Thus, each polling cycle 81 includes both sent and received bits. Once the first polling cycle 65 has been sent and received, the next polling cycle 66 will be performed. Because each polling cycle 81 establishes one bit of the selected terminal address, the method is called "Bit At a Time", or BAT.

FIG. 7 shows that the typical polling frame 75 has a start bit 76, a "feedback" bit 77, and a "test for bit" 78. For this example assuming a one MBit/Sec medium, and a maximum of 1 $\mu$sec travel time each way, the response window 79 is about 3 $\mu$sec, or 3 bits long. A 1 $\mu$sec travel time at sixty percent of the speed of light provides for a distance of over 500 feet from the controller to the most distant node. With these parameters the total width of each polling cycle is 6 bits. Notice the response pulses 80 may overlap within the response window. Although in most methods, these collisions would produce errors, in the BAT polling scheme they are inconsequential because the controller 1 is merely looking for a response 80, any response, that may occur during the response period 79.

If the medium 3 being used for the polling uses zero crossing waves of a fixed frequency to represent a pulse for transmission, such as in carrier based system, it is possible that multiple signals arriving simultaneously could cancel out if the signals were out of phase. To correct this problem, when the medium 3 utilized requires, a delay calibration mechanism is utilized to add 0, 1, 2, or 3 quarter wave lengths permanently to the response time of a particular terminal node 2, through use of a calibration session when the node signs on to the system. Alternately, response pulses 80 may be sent by randomly warbled waves, such as a "white noise" squawk, or incoherent light pulse. Either calibration or warbling ensures that amplification of the coincident signals will occur rather than attenuation. These techniques are thoroughly discussed in the literature, and are assumed to be known to one skilled in the art.

If the network requires return pulse calibration to prevent cancellation or if every node for some other reason cannot reliably see the return pulses 80 of every other node, then the feedback bit 77 must be contained in each polling cycle 81 from 1 to n, and the additional confirmation cycle n+1 73 added, as shown in FIG. 6. The feedback bit f 77 in cycle n+1 broadcasts to all nodes 2 the results of the previous test in cycle n. Note that when this is done, the additional confirmation cycle n+1 73 provides absolute confirmation of selection, because only the selected terminal 2 can and does respond during the final cycle n+1 73.

Because the controller is only looking for a positive response 80 (a single 1 bit pulse) any time during the window period 79 (see FIG. 7) it does not matter if there are collisions between the responses 80 of the terminals 2. As long as terminals 2 that have become ineligible in any polling cycle 81 are restrained from further response during the rest of the polling sequence 59, the result of the sequence 59 will be one (if any request transmission) and only one terminal that is free to transmit.

BAT WITH FEEDBACK BIT

Figure 8:
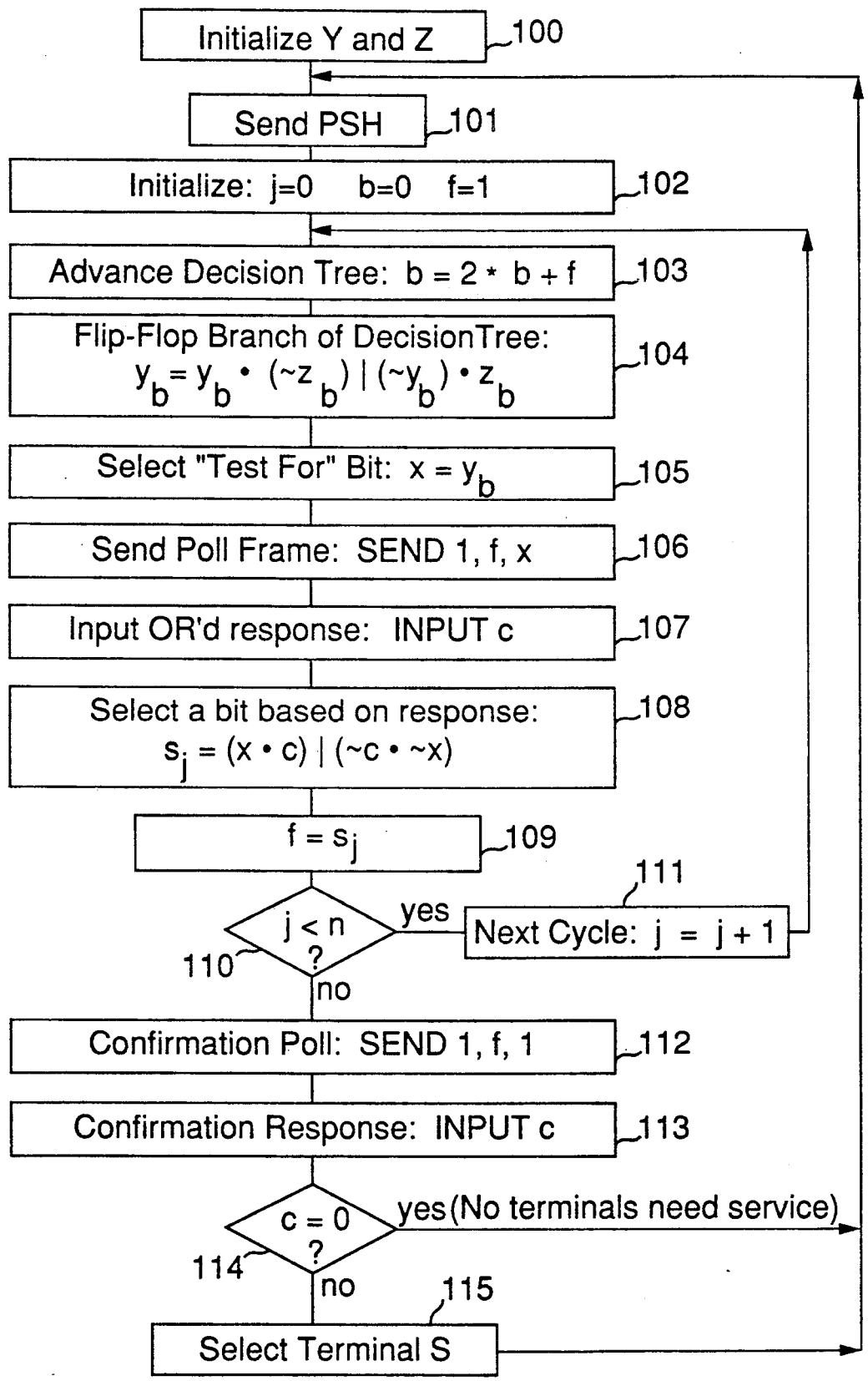
FIG. 8 is a flowchart of the controller's process in a BAT polling sequence using a feedback bit.

Referring now to FIG. 8 we can see a flowchart of the controller's 1 view of the Bat method when utilizing a feedback bit. Step 100 refers to the initialization of two bit arrays Y and Z, which is detailed in discussion of FIGS. 12 and 13. In step 101 the controller 1 sends the PSH 60 to initialize the polling sequence 59. Note that in this step the priority management variables may be changed by the procedure in FIG. 12 due to concurrent input occurring. In step 102 the controller 1 initializes j, the number of the current polling cycle 81 being processed, and b, the number of the current node in the priority decision tree (discussed later in reference to FIGS. 12 and 13) and f 77, the feedback bit from the prior polling cycle 81. In step 103, b is advanced to point to the next priority decision tree node (discussed later in reference to FIGS. 12 and 13). In step 104, if specified by the current z, the preference bit y at the current node b in the address selection priority tree is flip-flopped (discussed later in reference to FIGS. 12 and 13). Note that here "|" means logical OR, "•" means logical AND. In step 105 the "test for" bit x 78 is determined by the preference bit y at node b in the priority selection tree (discussed later in reference to FIGS. 12 and 13). In step 106 the poll frame 75 is sent to all terminals 2. In step 107 the OR'ed response c 79 is sensed from the media by the controller 1. In step 108, bit j of S, the address bit selected for polling cycle j, is set to be the "test for" bit x 78 if there was a response pulse c=1 80 in the response window 79, the opposite otherwise. In step 109 the feedback bit f 77 for the next cycle 81 is set equal to the address bit selected this cycle. In step 110 if j is less than n, the number of the highest order bit in the address, the controller 1 proceeds to step 111 to do the next polling cycle 81, else it proceeds to step 112 to send the confirmation fame 73. In step 111 j is incremented to indicate a new polling cycle 81 is beginning, and the controller 1 then proceeds back to step 103 to start a new polling cycle 81. In step 112 the controller sends the confirmation frame 73. In step 113 the confirmatio response 79 is sensed from the medium 3. In step 114 if no confirmation response pulse 80 was received, the controller 1 returns to step 101 to start a new polling sequence 59. In step 115 the controller 1 waits for the selected terminal 2 to send a message, or if multiple channels are being utilized off loads the terminal to another channel by sending a message granting access to the channel directly to the terminal 2. A new polling sequence 59 is then started by the controller 1 by branching to step 101.

Figure 9:
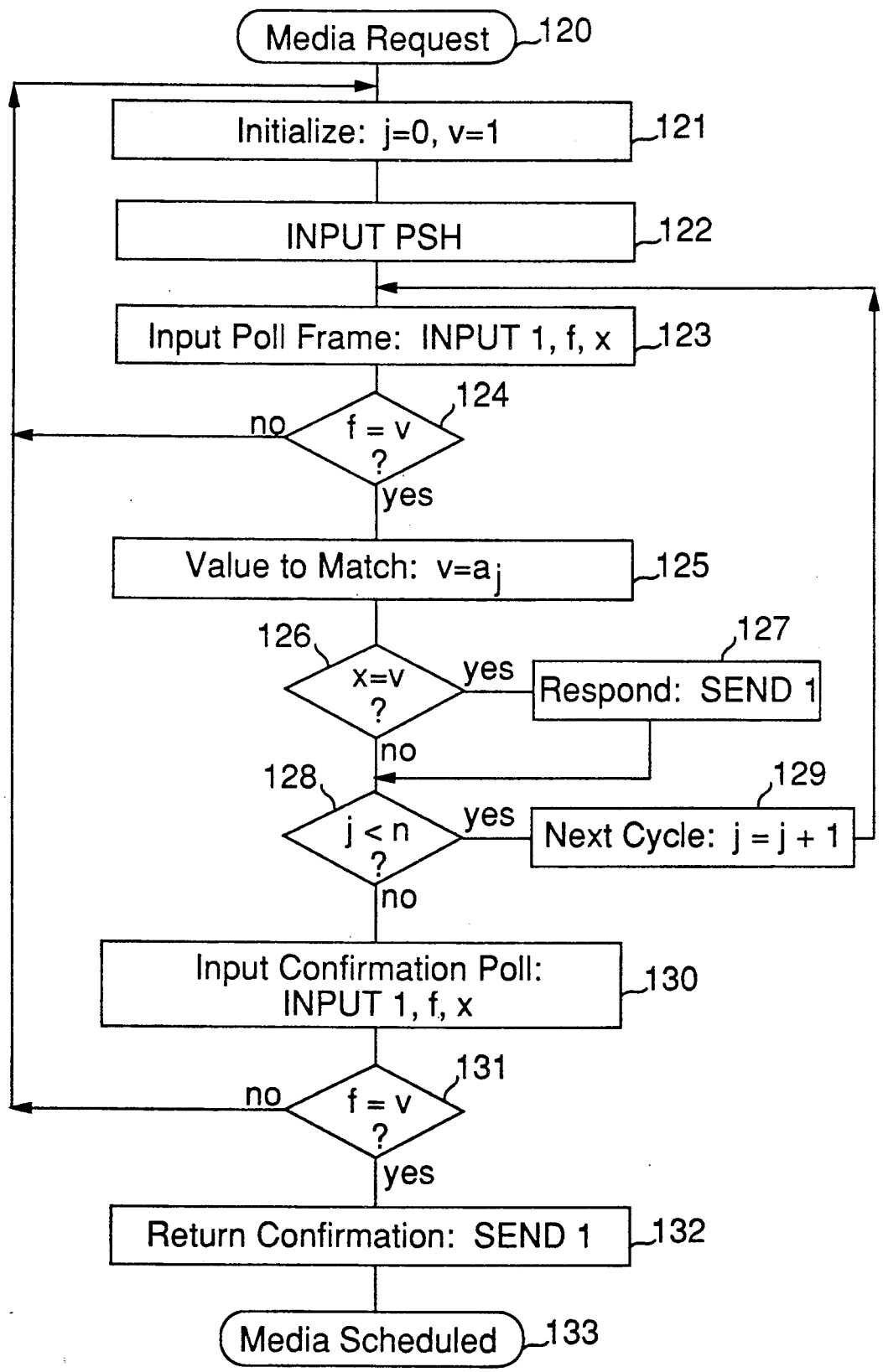
FIG. 9 is a flowchart of a terminal's process in a BAT polling sequence using a feedback bit.

Referring again to FIG. 9 we can see a flowchart of a terminal's 2 view of the BAT method when utilizing a feedback bit. Poll responding does not occur unless a terminal 2 has a message to send. The process of obtaining access to the medium 3 starts with a media request 120. In step 121 the polling cycle number j is initialized to 0, and the value to match v is set to 1. Note that in FIG. 8 step 102 the first feedback bit f 77 is arbitrarily set to 1. In step 122, the terminal 2 waits for a quiet time 74 followed by a PSH frame 60. In step 123 the terminal 2 inputs the poll frame 75. In step 124 if the feedback bit f transmitted by the controller 1 does not match the value to match v, the terminal's address A does not match the address S selected by the controller 1 this polling sequence 59, so the terminal 2 proceeds to initialize for another polling sequence 59 at step 121 and wait for another PSH 60 at step 122. If the value to match v from the prior polling cycle 81 matches the feedback bit f 77 the terminal proceeds to step 125, where the new value to match v is set to the value of bit j of the terminal's address A. In step 126, if the "test for" bit x 78 matches bit j of the terminal's address A, the terminal 2 proceeds to step 127, which responds to the poll 75 with a 1 bit response pulse 80 and proceeds to step 128, otherwise, if there is no mactch, the terminal 2 proceeds directly to step 128. In step 128 if all bits of the address space have not been processed, i.e. j is less than the number of the highest order bit in the address n, the terminal 2 proceeds to step 129 to do the next polling cycle 81, else it proceeds to step 130 to process the confirmation frame 73. In step 129 j is incremented to indicate a new polling cycle 81 is beginning, and the terminal 2 proceeds back to step 123 to start a new polling cycle 75. In step 130 the confirmation polling cycle 73 poll frame 75 is input. In step 131, if the feedback bit f 77 transmitted by the controller 1 does not match the value to match v, the terminal's address A does not match the address S selected by the controller 1 this polling sequence 59, so the terminal proceeds to initialize for another polling sequence 59 at step 121 and wait for another PSH 60 at step 122. In step 131, if the valuue to match v from the prior poll 81 matches the feedback bit 77 of the confirmation poll frame 75, the terminal 2 proceeds to step 132, where the final confirmation response pulse 80 is sent to the controller. At step 133 the terminal 2 either transmits directly, or, of a multiple channel medium 3 is being used, awaits a message from the controller 1 specifying the channel scheduled.

BAT WITHOUT A FEEDBACK BIT

If every terminal 2 can sense the response of every other terminal 2, the feedback bit 77 is not required, because each terminal 2 can obtain it during the response window 79. If this is the case for the example polling sequence 59 in FIG. 6, 8 polling cycles 81 will produce a selected terminal 2, that knows it is selected by looking at the responses during the polling cycles 80. The confirmation polling cycle 73 is not required. If no terminal 2 responds to any of the polling cycles 81, it indicates that the selected address is the reverse of the address most preferred in the polling sequence 59. For example, if 10011010 is set as the sequence of "test for" bits 78, and no terminals 2 respond, the controller 2 has then selected the address 01100101, the exact complement of the most preferential address. The selected terminal 2 is allowed to transmit following the polling cycle 81 corresponding to the last bit in the network addresss space. If there are no responses 80 during the polling sequence 59, and no terminal 2 transmits in an allotted time following a polling sequence 59, none was requesting access to the medium 3 prior to the start of the polling sequence 59, or some kind of error has occurred. If there are any positive responses 80 during the polling sequence 59, a terminal is selected or some kind of error has occurred. Alternately, prior to starting a polling sequence, a controller 1 could send a message to all terminals requesting a response if service is requested. This would reduce the average response time in a lightly loaded network because it would avoid repeated lengthy sequences when no terminal requires service, and provide positive confirmation prior to the sequence. This method would be disadvantageous in a heavily loaded network, however.

Figure 10:
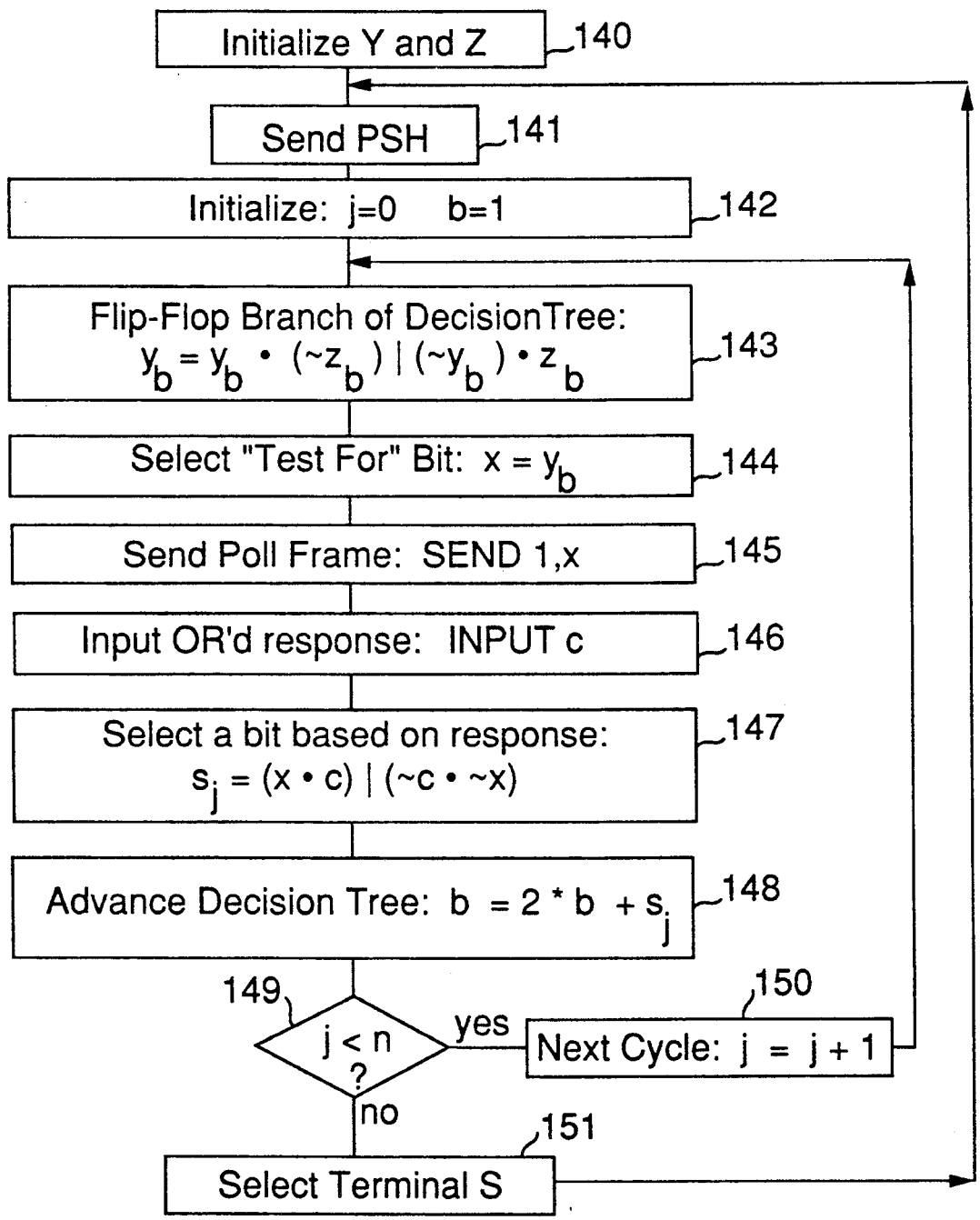
FIG. 10 is a flowchart of a controller's process in a BAT polling sequence not using a feedback bit.

Referring now to FIG. 10 we can see a flowchart of the controller's 1 view of the BAT method when not utilizing a feedback bit. Step 140 refers to the initialization of two bit arrays Y and Z, which is detailed in discussion of FIGS. 12 and 13. In step 141 the controller 1 sends the PSH 60 to initialize the polling sequence 59.

Figure 12:
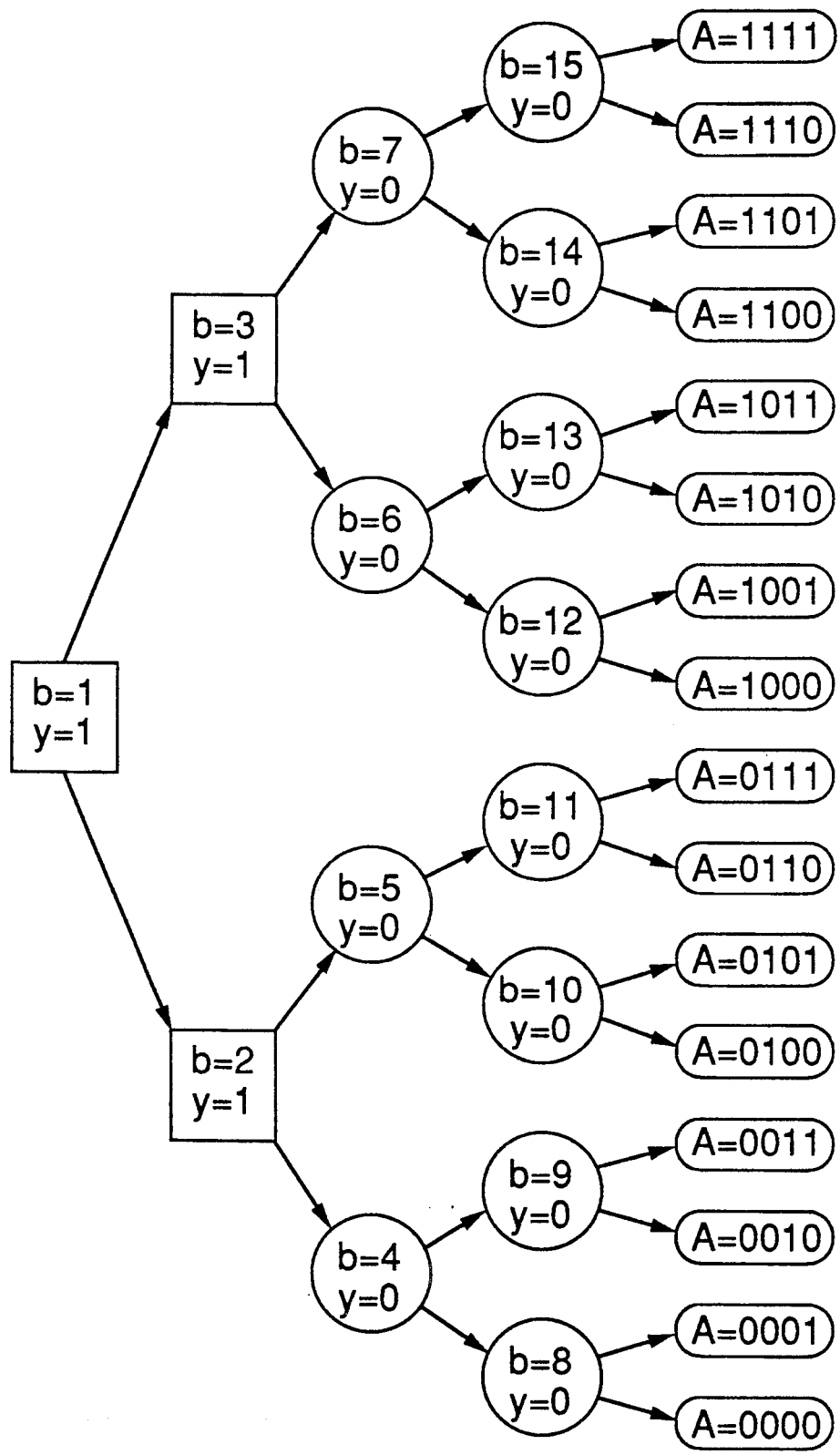
FIG. 12 is a diagram of a polling sequence priority management method in decision tree format.

Note that in this step the priority management variables may be changed by the procedure in FIG. 12 due to concurrent input occurring. In step 142 the controller 1 initializes j, the number of the current polling cycle 81 being processed, and b, the number of the current node in the priority decision tree (discussed later in reference to FIGS. 12 and 13). In step 143, if specified by the current z, the preference bit y at the current node b in the address selection priority tree is flip-flopped. (discussed later in referennce to FIGS. 12 and 13). In step 144 the "test for" bit x 78 is determined by the preference bit y at node b in the priority selection tree (discussed later in reference to FIGS. 12 and 13). In step 145 the poll frame 75 (less feedback bit 77) is sent to all terminals 2. In step 146 the OR'ed response c 79 is sensed from the media by the controller 1. In step 147, bit j of S, the address bit selected for polling cycle j, is set to be the "test for" bit x 78 if there was a response pulse c=1 80 in the response window 79, the opposite otherwise. In step 148, b is advanced to point to the next priority decision tree node (discussed later in reference to FIGS. 12 and 13). In step 149 if j is less than n, the number of the highest order bit in the address, the controller 1 proceeds to step 150 to initiate the next polling cycle 81, else it proceeds to step 151 because a terminal 2 has been selected. In step 150 j is incremented to indicate a new polling cycle 81 is beginning, and the controller 1 then proceeds back to step 143 to start a new polling cycle 81. In step 151 the controller 1 waits for the selected terminal 2 to send a message, or if multiple channels are being utilized off loads the terminal to another channel by sending a message granting access to the channel directlyy to the terminal 2. A new polling sequence 59 is then started by the controller 1 by branching to step 141.

Figure 11:
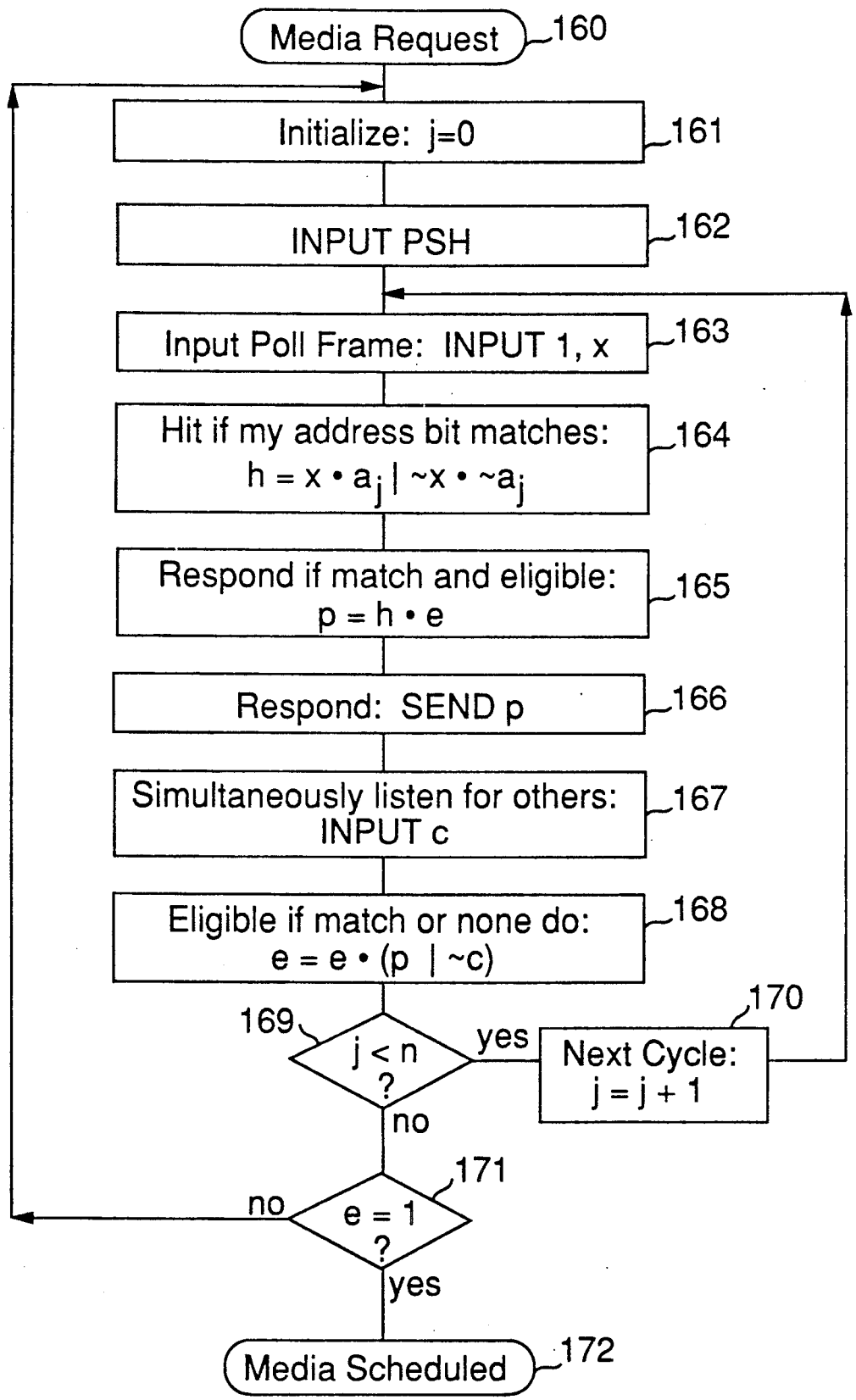
FIG. 11 is a flowchart of a terminal's process in a BAT polling sequence not using a feedback bit.

Referring now to FIG. 11 we can see a flowchar of a terminal's 2 view of the BAT method when not utilizing a feedback bit. Poll responding does not occur unless a terminal 2 has a message to send. The process of obtaining access to the medium 3 starts with a media request 160. In step 161 the polling cycle number j is initialized to 0. In step 162, the terminal 2 waits for a quiet time 74 followed by a PSH frame 60. In step 163 the terminal 2 inputs the poll frame 75 (less feedback bit). In step 164 it is determined if bit j of the terminal's address A matches the "test for" bit x 78 (i.e. hit bit h h=1) or not (i.e. hit bit h is 0.) In step 165 the response bit p 80 is 1 if address bit matches and terminal 2 is still eligible, 0 (null) otherwise. In step 166 a response bit 80 is sent to the medium, and therefore to all terminals, if p is 1, otherwise there is no pulse sent. In step 167 the value c obtained by lisening to the medium 3 durint the response window 79 is obtained. In step 168, if eligible at the start of the polling cycle 81 then eligibility continues (i.e. e is 1) if the terminal 2 sent a response, or no other terminal did. In step 169 if all bits of the address space have not been processed, i.e. j is less than n the number of the highest order bit in the address, the terminal 2 proceeds to step 170 to initiate the next polling cycle 81, else it proceeds to step 171 to determine final eligibility. In step 170 j is incremented to indicate a new polling cycle 81 is beginning, and the terminal 2 proceeds back to step 163 to start a new polling cycle 75. In step 171, if the terminal 2 is not still eligible, i.e. eligibility bit e is 0, the terminal's address A does not match the address S selected by the controller 1 this polling sequence 59, so the terminal proceeds to initialize for another polling sequence 59 at step 161 and wait for another PSH 60 at step 162. If still eligible at step 169, the terminal 2 has been selected, and proceeds to step 172. At step 172 the terminal 2 either transmits directly, or, if a multiple channel medium 3 is being used, awaits a message from the controller 1 specifying the channel scheduled.

Note that the process in FIG. 11 is simple enought to be implemented with a relatively inexpensive circuit involving only simple logic components and shift registers. Note also, that the "test for" bits 78 could be moved from the polling cycles 81 to the PSH "other" frame 64, or eliminated to the degree balanced priority is not required. However, moving the "test for" bits 78 to the PSH 60 provides no benefits in transmission time reduction, and greatly limits your options for priority management.

POLLING SEQUENCE PRIORITY MANAGEMENT TREE

Referring now to FIG. 12, we can see a diagram in decision tree format showing all meaningful values of b in FIGS. 8 and 10, for a network having 16 addresses. The controller 1 starts at the root node, where $=1$, in the first polling cycle 81. The controller advances one node forward with each polling cycle 81. The controller advances upward in the decision tree when the selected address bit s for the current cycle is 1, and downward when it is 0. Note that the upward node from a given node d is at $b=2*d+1$, while the downward node from node d is at $b=2\%d$. At the end of the decision process one, and only one, address is finally chosen. Associated with each meaninful value of b is a branch preference bit y. The value of y at decision node b is 1 if it is preferred that the controller 1 select an address with a 1 in the address bit being tested by the current polling cycle 81, if a terminal 2 with such a bit requires service. Another way of looking at this is $y=1$ at node b if it is preferred to branch up when at node b, $y=0$ if it is preferred to branch down. To take the branch in the desired direction, if possible, the controller 1 sets the "test for" bit x 78 equal to y, and sends the poll frame 75. If any terminals 2 have the desired bit x 78, the response c 79 will be 1, and the desired branch is achieved. If no terminals 2 have the desired bit x 79, the opposite branch must be taken, and is. Note that if y remains fixed at 1 for a node b, all addresses on the tree reached through the upward branch from node b (the high group of b) will have priority over all addresses reached through the lower branch from node b (the lower group of b). If $y=0$ the priority is reversed. In this manner, total control of the priority of any terminal over any other is achieved through choices of y values.

If the value y at a node b is flip-flopped each time node b is reached, the high group of b will have a balanced priority with respect to the low group of b. To control whether priority is fixed or balanced an additional bit z is utilized at each node b. If $z=1$ at node b the y is alternated providing balanced priority, otherwise the y remains fixed, providing fixed priority with respect to the high and low groups of b. There are two methods of balancing priority with respct to the groups of a node b. One method, shown on FIGS. 8 and 10, flip-flops y on each arrival at node b. An alternate method is to always set y to the opposite of the branch just taken (i.e. $y=\sim s$), which avoids the possibility of reducing service to one group when, for example, the alternate group contains terminals that consistently and continuously request a short duraction access followed by a long duration access. It is possible to add another bit array with a bit for every possible b, augmenting arrays Y and Z, which specifies for each node b whether to alternate priorities, or give precedence to the opposie of the branch just taken.

If an address contains bits 0 through n, where bit n is the highest order bit, the address space contains $N=2^{n+1}$ addresses, where $m=N-1$ is the largest address. The valid values for b then are 1 through m. Therefore, total control of address selection priority can be maintained with storage for 2*m bits, only 2 bits per address. Because selection from a space of $2^{n+1}$ addresses can be made in n+1 fixed length polling cycles 75, the selectionprocess is O(log n) efficient.

In specifying priority criteria, the first bits polled, i.e. the highest order bits, have the greatest weight because terminal eligibility is eliminated based on the highest order bits first. If it is desirable to provide a message priority, it is possible to do so by adding extra bits to the address of a terminal 2 to specify message type. In this manner, a given physical terminal 2 would have multiple (logical) terminal addresses, all unique network wide. Note that it is possible to have each terminal 2 apply a transformation to its address prior to a polling sequence in order to achieve any priority scheme involving terminal class or message class. It is preferable, however, to have this kind of logic in the controller because it is paid for only once, and is more readily modified based on changing needs. If message type is to take priority over terminal priority network wide, the high order bits of the address must be used to specify message type. If message type is to be secondary to other terminal related attributes, the message class bits can occupy lower positions from the bits specifying the terminal attributes.

FIG. 12, for example, shows a network with four physical terminals, and 16 logical terminal addresses. This supports 4 message classes, which take precedence over terminal address. The message class occupies the high order 2bits, while physical terminal address occupies the low order 2 bits. The nodes b=1, b=2 and b=3 are enclosed in boxes indicating fixed priority selection (i.e. z=0), while nodes b=4 through b=15 are enclosed in circles indicating balanced priority selection (i.e. z=1). Note that, in this example, message class 3 is highest priority, 0 is lowest because y is fixed at 1 for nodes 1 2 and 3.

Figure 13:
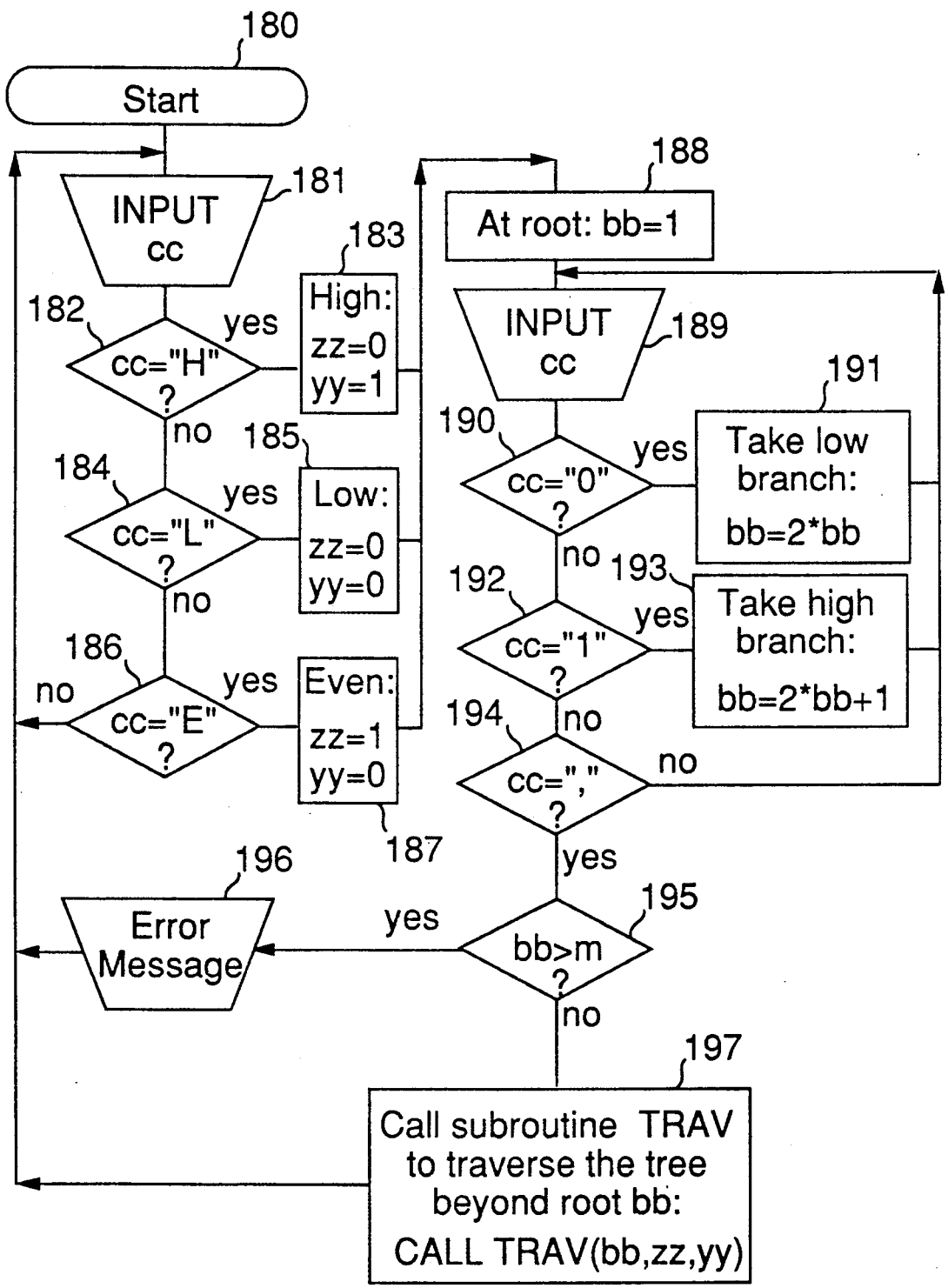
FIG. 13 is a flowchart of a procedure, reference in FIGS. 7 and 9, to input specifications for priority management variables in the controller.
Figure 14:
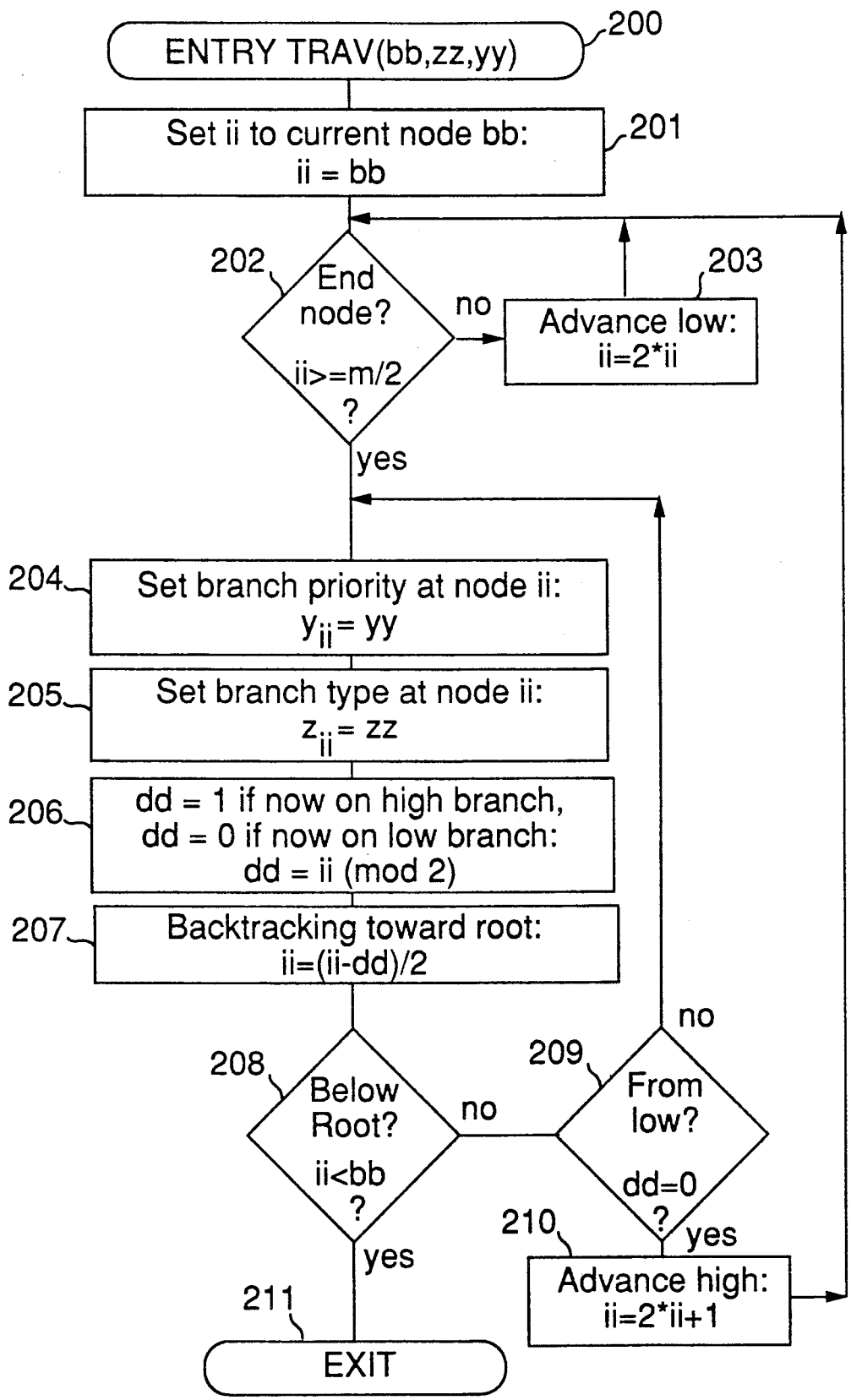
FIG. 14 is a flowchart of a procedure, reference in FIG. 12, to initialize priority management variables in the controller.

FIGS. 13 and 14 are flowcharts of a procedure, referred to in FIGS. 8 and 10 as "initialize Y and Z", that permits the specification of priority management variables in a convenient form. For example, the input H, E00, E01, E10, E11, to the procedure in FIGS. 13 and 14 produces the priority decision tree shown in FIG. 12. The input to this procedure is in the form of node specifying tokens consisting of a letter H, E, or L, followed by a strin of 0 or more 1's or 0's delimited by a comma. All other input is ignored and considered commentorial. The letters specify the values of the priority specification bits to be assigned a particular node, and all nodes subordinate to that node, i.e. all nodes that have the specified node as a root. "H" means assign priority to all subordinate high branches, "L" means assign priority to all subordinate low branches, and "E" means assigne an evenly balanced priority to all subordinate nodes. "H" assigns z=0, y=1, "L" assigns z=0, y=0, and "E" assigns z=1, y=0 to all subordinate nodes, and the specified node. The string of 0's and 1's specify a path to the node being specified. Starting at the root node 1, a "0" means branch low, a "1" means branch high. So, for example, "E10," means find node 6 by branching high to node 3 and then low to node 6. Then, assign z=1, y=0 to nodes 6, 12, annd 13. Note tht the sample input above would initialize a similar tree to FIG. 12 in a very large address space, because the subroutine TRAV traverse all subordinate nodes to the root specified applying the specified values of y and z.

Referring now to FIG. 13, the priority management specification input procedure starts at 180 when the controller 1 is powered on. This procedure could also be performed in parallel to operation of the controller without significant impact to the network, because only the priority of selection is adversely affected. If any terminal 2 needs service at the start of the polling sequence 59, one and only one address will be selected regardless of the values of Y and Z at any point during the polling sequence 59. Step 181 inputs one character cc of the priority specifying information. This input could be from a console on the controller, from nonvolatile memory, and/or provided to the controller node server 18 by the controller node main computer via the interface 21. In step 182, if the character is "H", then the controller 1 proceeds to step 183, sets the desired value of z for subordinate nodes zz=0, yy=1, and proceeds to step 188, otherwise it proceeds to step 184. In step 184, if the character is "L", then the controller 1 proceeds to step 185, sets the desired value of z for subordinate nodes zz=0, yy=0, and proceeds to step 188, otherwise it proceeds to step 186. In step 186, if the character is "L", then the controller 1 proceeds to step 187, sets the desired value of z for subordinate nodes zz=0, yy=0, and proceeds to step 188, otherwise it assumes the inpuut is part of commentarial text and ignores it by proceeding back to step 181, for more input. At step 188 bb is initialized to point to the current root node 1. In step 189 an additional character cc is input, so that the controllerr 1 can process the 0's and 1's part of the token. In step 190, if the character is "0", then the controller 1 proceeds to step 191, to take the low branch to a new root node b by setting b=2*bb, and proceeds to step 189 for more input, otherwise it proceeds to step 192. In step 192, if the character is "1", then the controller 1 proceeds to step 193, to take the high branch to a new root node b by setting b=2*bb+1, and proceeds to step 189 for more input, otherwise it proceeds to step 194. In step 194, if the character is not ",", then the controller assumes the character is commentarial and ignores it by proceeding back to 189 for more input, otherwise it proceeds to step 195. In step 195, if the current root node bb is beyond the maximum possible size m, the controller 1 proceeds to 196, to give an error indication, and then to 181 to look for the start of another token, otherwise it performs the procedure "TRAV" specified in FIG. 12, which traverses the tree with bb as a root, setting z=zz, and y=yy at every node traversed. Following step 197 the controller 1 then proceeds back to step 181 to look for the start of another token.

Referring now to FIG. 14, In step 200 the controller enters subroutine TRAV with bb specifying the root node of the tree to traverse, and zz and yy the values to apply to z and y respectively. At step 201 the current node ii is initialized to the current root node bb. In step 202, if not at an end node of the tree, i.e. ii= <(m/2), the controller 1 branches to 203 to advance on the low branch of the sub-tree by setting ii=2*ii, and then repeated the advance as far as possible by proceeding back to 202, otherwise, it proceeds on to step 204. In steps 204 and 205 the priority specifying bits y and z are set for node ii. In step 206 dd is set to be equal to the least significant bit of the number of the current node ii, so when backtracking the controller 1 can remember if the backtrack occurred from a high or low branch. In step 207 the controller, having completed the current node ii, backtracks toward the root. In step 208, if backtracking has not gone below the root, i.e. ii > =bb, the controller branches to step 209 to see if there is a subtree on the high branch (which is therefore unprocessed, because processing only occurs on backtracking from a high branche, otherwise the controller proceeds on to the exit 211, to return to the process in FIG. 13. In step 209, if backtracking from a low branch of the tree, the controller proceeds on to step 210 to advance on the high branch, and then back to step 202 to start the advance again, if possible.

BAT PERFORMANCE

Applying BAT in a 1 MBS LAN, we have a polling sequence of 3 $\mu$sec. for the start bit 62 and poll indicator code 63, 54 $\mu$sec. for the 9 polling frames 61, including feedback bits, and 8 $\mu$sec. for quiet time, producing a poll of 65 $\mu$sec. tocomplete. A typical 4 MBS token ring network takes 33 $\mu$sec. just to pass the token through one node. Thus, using the example discussed above, if only one terminal needed service in the 256 node network, the BAT polling scheme identifies that terminal, with priority, in 65 $\mu$sec. A token ring scheme must traverse an average of 128 nodes (50 percent of the ring) at 33 $\mu$sec. per node and would take 4224 $\mu$sec. to initiate service. Due to the rapid terminal identification provided by BAT, which works as quickly under both low and high loading conditions, network utilizations of over 99 percent are possible using the BAT polling scheme.

BAT is optimally applied on a narrow band of a multi-band medium, dedicating the other bands to messages. The relatively long travel times, during which no information can flow, are thereby spread out over a "thin" medium, and will use a minimum number of bits per unit of time. For example, in system with a 300 MBS aggregate data rate and an average message length of 4K (32,768 bits), the equivalent of 109 $\mu$sec. of dedicated use of the bandwidth is consumed per message per second. Assuming at least a 2 $\mu$sec per message two-way travel time, gives 111 $\mu$sec. per two-way message on average or about 9,000 messages per second in a saturated network. A 6 bit polling cycle 65, 3 bits for the PSH 59, and 8 bits for quiet time 74, will handle an 11 bit address space with a 77 bit polling sequence. Thus, this sample configuration can handle 12,987 polls per second in a 2048 node network if a 1 MBS multiplex channel is dedicated to polling. 1 MBS out of the 300 MBS bandwidth produces an overhead of 0.33 percent, giving a utilization of 99.67 percent.

DIGIT AT A TIME POLLING

A second embodiment of the invention is called *Digit At a Time* (DAT) polling. Given current technology, the most limiting constraint on polling time is the time required to travel the physical distance from the controlling node to the most distant node at the speed of light. Because the speed of light is a constant, the only way to effectively reduce polling time is to reduce the number of polling cycles, thereby reducing the number of trips through the network. To reduce the number of polling cycles, more class information must be obtained frome each poll. Polling must proceed not a bit at a time, but a digit at a time in the largest feasible base.

DAT provides more informattion than BAT in each polling cycle by using time delays to classify nodes. It is a well known technique to avoid collisions by forcing all nodes to respond at different time intervals. In U.S. Pat. No. 4,595,921 each terminal is spaced at a fixed distance from the others. Additional cable length is used to ensure that no two terminals are the same distance from the controller. The controller is then programmed to calibrate the distance from each terminal and from that information, it is possible to quickly identify a specific terminal. The problem with this system is that it is only practical for systems with few terminals. As the number of terminals increases, the cabling overhead becomes too great a burden for the system. This system is also designed to avoid collisions by ensuring, through cables, that no two terminals' reply signals would arrive at the controller simultaneously. Because BAT and DAT polling are ambivalent to colliding signals, there is no need to ensure segregation of every reply signal. However, the time delay of groups of returning pulses can be used to classify their sending nodes. Multiple classifications, made in a contextual and nested manner, can rapidly identifiy many terminals requiring service in a single polling sequence. This is the fundamental concept of DAT.

Unlike adaptive probing schemes such as that proposed by Brophy, et al., in U.S. Pat. No. 4,071,908, which require statistical means to determine the size of group to be probed, the DAT method directly and positively identifies multiple sub-classes of a polled class requiring service. The DAT method is so efficient in a heavily loaded network that, even with a large address space, terminals requiring service can be identified with an average of lowerr than 3 bits of polling channel information per terminal selected. If a network suddenly becomes highly inactive, adaptive probing schemes continue probing many small address classes uselessly, while DAT directly finds even a single terminal in a time proportional to the number of digits in the network address.

To make the DAT method possible, each teminal must be able to accurately control the response window in which its pulses arrive at the controller. To ensure this capability, the controller, at system startup or terminal sign-on, sequentially calibrates each node by timing a sample response, and then calculating and sending back to that node a latency time compensating value (LTCV). If more convenient, calibration could occur at terminal installation time. However, this would preclude moving a terminal or changing the network in any way that would change terminal LTCVs, without having to recalibrate. The LTCV is used to adjust the latency of the terminal so the return pulse arrives at the controller at exactly the maximum allowable network delay time. Thus, at the conclusion of sign-on, the return pulse from every responding terminal, given no class delay, arrives at the controller with exactly the same time delay. Pulses returning with this time delay are considered to be in response class zero.

Figure 15:
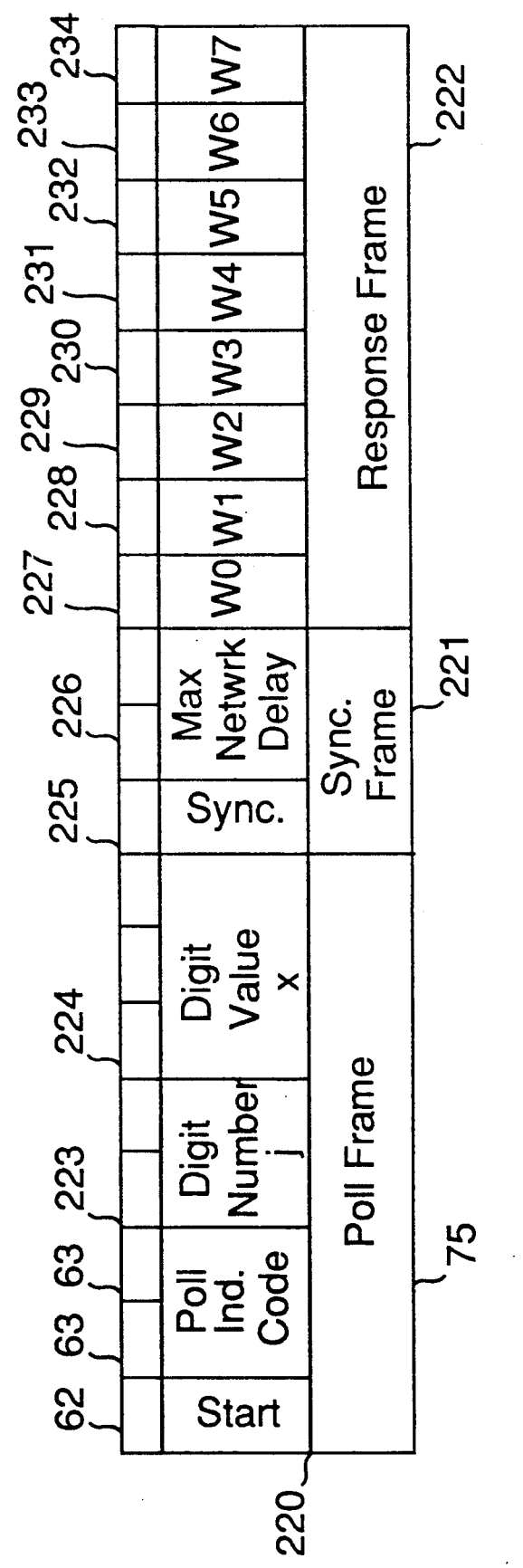
FIG. 15 is a bit map for a DAT polling cycle.

We refer now to FIG. 15, which is a block diagram of a DAT polling cycle 220 using base 8. A DAT polling sequence consists of a variable number of DAT polling cycles 220. Each polling cycle 220 consists of a poll frame 75 sent by the controller 1 to specify the value of the current digit of the address space being polled, a synchronization frame 221 sent by the controllerr 1 for timing purposes, and a response frame 222 returned by terminals 2. A DAT poll frame 75 consists of a start bit 62 and poll indicate code 63 and other informatoion 64 like the BAT polling frame. Unlike BAT, the other informaiton 64 consists of digit number j 223, and digit value x 224. The digit number j 223 specifies which digit of the address is being polled, the high order digit being digit 0, the low order digit called maxj. Digit value x 224 is a number, from 0 to one less than the base in which the addresses are being procesed, specifying the value a terminal 2 must have in positon j−1 of its address (in the base being used) if it is to respond. For example, if addresses are expressed base 8, x is a number from 0 to 7, say 5, so if a terminal is to respond, digit j−1 must be 5, and all higher order digits must have matched the most recent poll frame 75 for their respective positions. Of course, if j=0 then all terminals requiring service are eligible to respond. A poll frame 75 may be sent on the same or a different channel as the sync. frame 221, and response frame 222.

Unlike the BAT polling sequence 59, a DAT polling sequence does not require a polling sequence header 60. The first polling cycle 220 of a DAT polling sequence is identified by the fact that the polled digit number 221 and digit value x 224 are zero.

The sync. frame 221 consists of a sync. pulse 225 followed by a time interval 226 equal to the maximum allowable network wide latency time. No response should be seen by the controller 1 in the max delay window 226, as this is assured through calibration.

The response frame 222 consists of response class windows 227 through 234. A unique response window is established for each value a digit may assume in the address base being used. A terminal 2 is said to be in response class 5 if the polled digit, i.e. digit j, of the terminal's address contains a 5. Thus, if class 5 is set to have its responses arrive 5 μsec. after those in response class 0, then each terminal within class 5 would, following sensing the sync. pulse, delay a time equal to its own LTCV plus 5 μsec., to ensure that all return pulses 80 from class 5 terminals are OR'd together in the medium 3 and sensed as a single pulse 80 in the response class 5 window (W5) 232.

As with the BAT Polling Schemi, terminals not selected by all higher level polls are blocked from responding further, making the polling process context sensitive. This maximizes the information flow per poll, and minimizes the data flow and network travel time per terminal selection. At the lowest polling level, i.e. when j=maxj, multiple terminals may be selected, up to one per class, from a single polling cycle, thus providing a very low ratio of polling message bits per terminal selected. As the probability of multiple hits on the lower levels increase, probabilities at higher levels increase much more, thus providing higher polling efficiency automatically.

Figure 16:
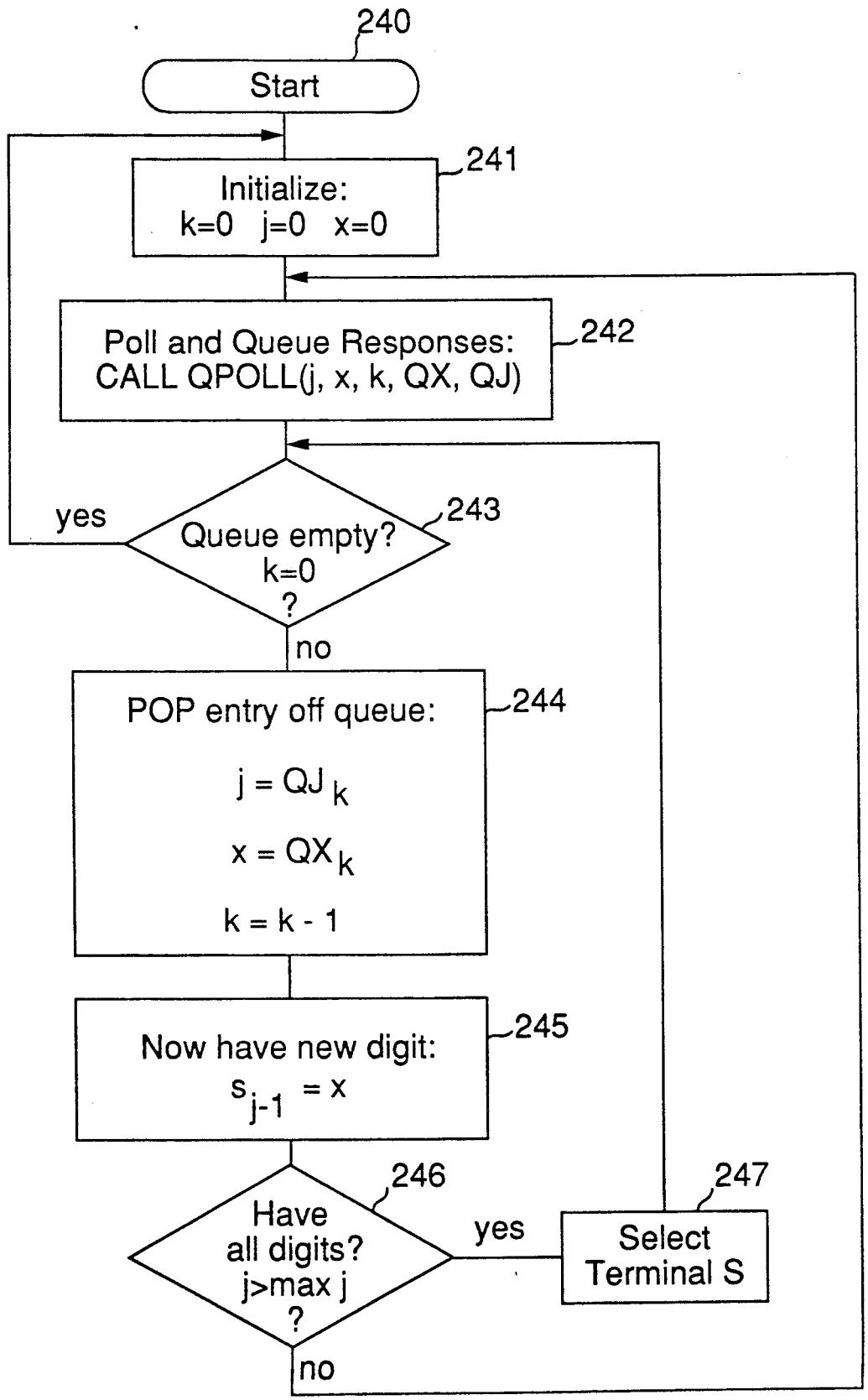
FIG. 16 is a flowchart of a controller's process in a DAT polling sequence.

Referring now to FIG. 16, we see, from the controller's point of view, a simple form of the DAT polling method. Step 240 starts the polling process. In step 241, initialization is performed. Note that terminal sign-on and calibration is left out of this procedure because references on such processes are numerous and assumed readily available to one practiced in the art. Step 242 calls procedure QPOLL which is described in detail in FIG. 17. QPOLL sends the polling 75 and sync. 221 frames, and inputs the class window responses 222, queuing positive responses 80 in stack arrays QX and QJ, the top of which is pointed to by k. In step 243, if the queue is empty, i.e. there are no unprocessed positive responses 80, then either an error has occurred or no terminals 2 need service, so the controller 1 proceeds back to step 241 to start another polling sequence. In step 243, if the queue has entries, the controller 1 proceeds to step 244 to pop an entry off the stack giving a new j and x to process. In step 245 the new digits s in position j−1 of the address selected S is set to x. In step 246, if all digits of S have been determined, i.e. j>maxj, the controller 1 then proceeds to step 247 where terminal S is selected. At this point, terminal S known it is queued, and is awaiting authorization to transmit, and if a multi-channel medium 3 is used, also is awaiting designation of a channel of the medium 3 to use. If at step 246 the final digit has not yet been selected, the controller 1 proceeds back to step 242 to continue polling at the next level.

Figure 17:
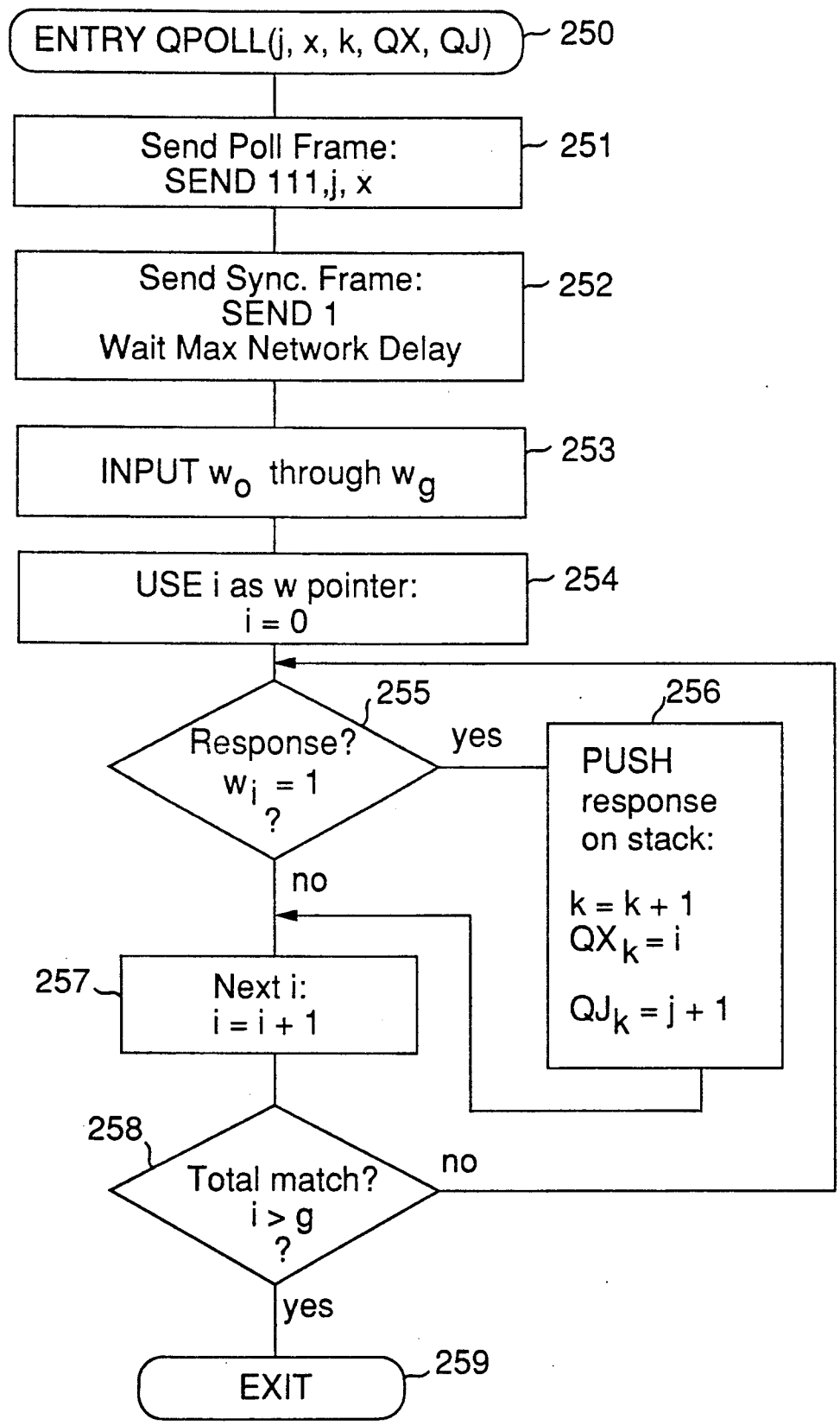
FIG. 17 is a flowchart of a procedure, reference in FIG. 16, to poll and queue the results.

Referring now to FIG. 17, we see the procedure QPOLL referenced in step 242 of FIG. 16. At step 250 the procedure QPOLL is entered with j, the number of the current digit being processed 220; x the value of the current digit being processed 224; k, the top-of-stack pointer; and QX and QJ, the arrays to stack the digit (x) and position (j) pairs yet to be processed. In step 251 the controller 1 sends the poll frame 75. In step 252 the sync. pulse is sent and the controller 1 waits the max network delay period 226 to complete the sync. frame 221. In step 253 the controller 1 inputs the response window values $w_0$ through $w_g$. In step 254 i is initialized to be used as a pointer to each response as it is processed. In step 255 if the response $w_i$ in window i is 1, the controller 1 proceeds to step 256 to stack that information for processing, otherwise, it proceeds to step 257. In step 256, the value of i is stacked for processing as a new x, and j+1 is stacked as the new digit position so the new digit x will be processed at the appropriate polling level, and the controller 1 proceeds on to step 257. In step 257, i is incremented to process the next response window. In step 258 if i is not greater than g, the number of the least significant digit, then the controller 1 proceeds back to step 255 to continue processing responses, otherwise, all windows from this polling cycle have been processed, and the controller 1 then exits the subroutine QPOLL at EXIT 259.

Figure 18:
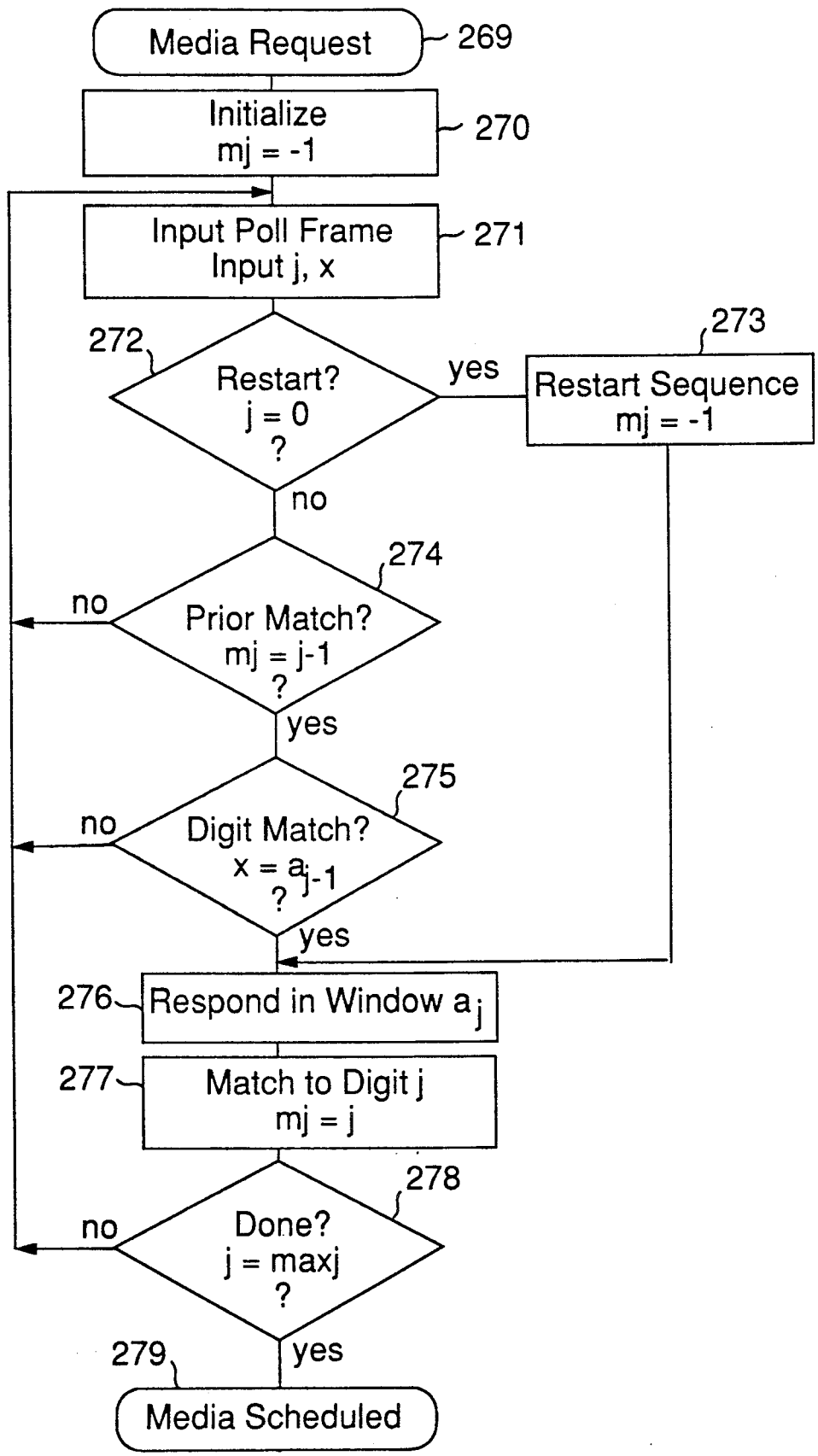
FIG. 18 is a flowchart of a terminal's process in a DAT polling sequence

Referring now to FIG. 18, we see the process corresponding to that shown in FIGS. 16 and 17, as it occurs in a terminal 2. No responses occul unless the terminal 2 issues a media request 269, which starts the responding process in FIG. 18. In step 270 the terminal 2 initializes the match level mj to −1, i.e. the highest value of j for which a match has occurred from 0 to j, which insures no poll frame 75 will be processed until the first frame of a polling sequence. In step 271 the poll frame 75 is input, providing j the digit number 223 and x the digit value 224 for the current polling cycle 220. In step 272 if j=o the start of a polling sequence is just beginning, so the terminal proceeds to step 273 to set the current match level back to −1, otherwise to step 274. This guarantees the controller can restart a sequence any time no responses 80 are received. Step 273 proceeds to step 276 to respond to the first frame of a sequence. In step 274, if there was not a digit match at the prior polling level j−1, then the terminal 2 goes to step 271 to await another polling frame 75, otherwise, it proceeds to step 275. In step 275 the terminal 2 checks to see if the digit value x 224 of the current poll frame 75 matches the previously polled address position, position j−1, of the terminal's address A, i.e. $x=a_{j-1}$. If not, the terminal 2 proceeds back to step 271 to await another polling frame 75, otherwise, it proceeds on to step 276. In step 276, the terminal responds with a pulse in window $a_j$, by delaying the LTCV interval, plust the amount required to delay from response window W0 227 to response window $a_j$. In step 277 the match level is advanced to the current level, because the terminal matches the poll. In step 278, if the final digit has not been matched, the terminal 2 proceeds back to await another polling cycle 220 to resume comparing, otherwise, all digits of the address have been matched, so the terminal stops responding at exit 279, where the terminal 2 awaits direct authorization to transmit from the controller 1, which has at this either queued or selected the terminal 2 for transmission. In a multi-channel environment, the controller 1 also assigns the terminal 2 a channel to transmit on at the time of authorization to transmit. When a channel becomes free, the controller 1 simply removes the highest priority terminal address (if any) from the list of selected terminals and assigns it to the free channel.

To implement priority based message handling using the high order bits as with DAT, it is best to maintain multiple queue arrays QJ an QX, one set for each priority. Let us assume for a moment we want to provide two message priorities, high and low. High priority messages come from addresses beginning with 4 through 7, low from addresses beginning with 0 through 3. When a polling sequence is processing the high priority messages, a complete sequence as described above occurs. However, after processing a lower priority polling cycle 220, the controller must immediately issue a level 0 poll to see if any high priority messages are to be processed. This special polling cycle is processed in steps 273 of FIG. 18. If there are higher priority messages, the controller then starts processing a high priority queue until empty. The terminals with low priority messages, that had their addresses partially satisfied, wait in step 273 until polling continues back at their lower priority level, and then resumes at step 274. This process is facilitated by adding message priority to the poll frame 75. When a higher priority queue is exhausted in step 243, the controller switches to a lower priority queue and repeats step 243. This process can also be facilitated by using another stack array QP to store the message priority, and maintaining the stack in order by priority before last in first out (LIFO). If priority enforcement within the constraint that it only be enforced at the completion of a polling sequence is adequate, this is much more easily implemented, by maintaining the selected terminal list in sorted order, or heap structure, when each new entry is made in step 247 in FIG. 16, or removed when channels free up.

An example of an application of DAT, as described by FIGS. 15, 16 and 17, is in providing two-way service on a broadband cable. If we want to provide service to a square mile area, with the controller at the center, we can assume a maximum cable length of 0.5 miles $\times 1.414 = 0.707$ miles. With an assumed pulse travel speed of $0.6 \times 186,000$ mi/sec $= 0.1116$ miles per $\mu$sec, we have a maximum data rate of about 7 $\mu$sec per bit to have a polling cycle 220 corresponding to FIG. 15, or about 150 KBS. Let us assume we use three 56 KBS full duplex channels for polling, and that each terminal 2 is assigned a polling channel at sign-on, with one third of the network assigned to each polling channel. With each terminal on a given channel assigned at 4 octal digit address, we have a maximum of 4096 terminals per channel $\times 3$ channels $= 12,288$ terminals serviced. Because the poll frame 75 and sync. frame 221 are sent on the outbound channel, 10 quiet (0) bits minimum will be sent on the outbound channel following each sync. bit 225, elminating a need for any additional delay between polling cycles 220. This gives us a polling cycle time of 19 bits, or about 3000 polling cycles 220 per channel per second. Assuming every terminal needs service simultaneously, and at a balanced priority, a polling sequence will result in 1 level 0 polling cycle 220, 8 level 1 polling cycles 220, 64 level 2 cycles 220, and 512 level 3 cycles 220 to identify all 4096 terminals requiring service. Thus, 585 polling cycles 220, or 11,115 polling bits identifies all 4096 terminals, giving an average of 2.71 polling bits on each of three channels takes about 0.2 seconds to identify all 12,000 terminals 2 requiring service. Thus, off loading the actual messages to multiple high speed channels, a maximum message rate of 60,000 messages per second could be handled by the DAT method in this example, which greatly exceeds normal transaction demands for 12,000 terminals. If a 200,000 KBS aggregate bandwidth is scheduled, this gives an average of about 16K bits per second per terminal, which must include travel time and messages to and from the controller (including notifying the terminal of its assigned channel). If the average message requirement for all terminals is at the 16 KBS, then the three polling channels will only be 20 percent utilized, while providing approximately a 1.2 second response time for all 12,000 terminals. Note that the 168 KBS full duplex bandwidth used to provide DAT polling is less than 0.2 percent of the 200 MB per second aggregate bandwidth scheduled, giving a 99.8 percent efficiency. Looking at the opposite extreme in this example, where no terminals are active and suddenly one terminal requires service, this terminal is identified in at most five polling cycles, or 95 polling channel bits. The terminal is therefore identified in about 0.6 milliseconds. Note that, at these efficiencies and speeds, a moderate error rate can readily be sustained, resulting in terminals not requiring service seiected by the controller, and/or terminals missed in a polling sequence, without a significant impact on average response time. Note also that much higher message rates can be sustained when the terminals include frames to the controller in messages sent by the terminals, that tell the controller to requeue the terminal for service, if it is known by the terminal that another message will need to be sent immediately, such as in a file transfer session, or voice grade or video communication.

Similarly, for a packet radio network, a 110 baud full duplex channel might be used for polling. This would allow a maximum service radius of approximately 1700 miles. An 11,115 bit polling sequence in this case would take a maximum of about 100 seconds to identify those, out of 4096 terminals, requesting service.

Another example is a low cost single channel full duplex fiber optic LAN design for a situation where maximum network delay is about 1 $\mu$sec. This could cover a building or ship with a maximum dimension of about 1000 feet. In this design, the sync. frame 221 and response frame 222 must be sent at a rate of 1 MB per second, while all other messages, including the poll frame 75 is sent at a higher rate, say 200 MBS. This produces a polling cycle 220 time of about 12 $\mu$sec. It therefore takes 7020 $\mu$sec to complete the polling sequence for a 4096 terminal address space. If 4096 selection messages, terminal messages, and controller responses are sent per second, an additional 12,288 μsec are lost to travel time. This leaves 98 percent of the 200 MBS bandwidth directly available to message traffic, or about 64K bits per second per each of the 4096 terminals. This design is ideally suited to the implementation of NAFs 7 as described in relation to in FIGS. 2 and 5. Note also that the 98 percent utilization does not change, even if the message transmission rate is increased a thousand fold to 200 GBS, which would provide 64 MBS per terminal on demand. If however, the maximum dimension is increased to 2000 feet, then maximum utilization would drop to 96 percent.

If response duration is too long to adequately time pulses into multiple windows, multiple sync frames 221 per poll frame 75 can be used to achieve the same effect. This eliminates the need for a LTCV calibration and use, but adds time delay due to the additional sync. frames 221.

Note that DAT performance in a multi-channel environment can be greatly improved if the responses 227 through 234 can be transmitted simultaneously on separate channels, or a combination of delay and multi-channel response employed. If time delay is eliminated, the need for LTCV calibration and use can be eliminated also, yet the processes in FIGS. 16, 17, and 18 remain unchanged. Using the packet radio network example above, we send the poll frame 75 and sync. bit 225 at a high data rate, say 1200 BPS, which compresses their time into one bit from the prior example. The response then occur simultaneously in the interval spanned by the max network delay 226 and W0 227 frames, but on different channels. Thus, the entire polling cycle 220 is reduced to 4 bits, or 45 milliseconds. The 585 polling cycles then only take 27 seconds.

I claim:

1. A polling method for a two way communication system comprised of a controller and a multiplicity of terminals, each said terminal having a unique binary address code of a common length of at least two bits, and said terminals having the capability of detecting and responding to codes sent from said controller, the terminal responses being binary codes which are observed by said controller as a single combined response code, said single combined response code being equivalent to the result of combining all said responses through logical summing, the objective of said polling method being the selection of an address of a terminal requiring service by storing the selected address in a work area in said controller and having the terminal with said selected address able to determine it has been selected, said controller including means to determine at any stage of the polling process a preferred value of a digit of said selected address, said polling method comprising the steps of:

a) having said controller establish a pointer designating a polled for digit, said polled for digit designated initially as the first digit of said terminal addresses and having said controller notify each of said terminals that a polling sequence is beginning, each terminal requiring service at the tome of the notification of polling sequence start being eligible to respond to future polls of said polling sequence, other terminals being ineligible to respond during said polling sequence;

b) having said controller broadcast at least one query poll to all terminals, said poll corresponding to said polled for digit of the address and said poll identifying said preferred value of said polled for digit;

c) having a simultaneous response from each said terminal still eligible to respond which has in said polled for digit of its address said preferred value, these terminals being called responding terminals;

d) having said controller wait for said single combined response code from said responding terminals, said single combined response code being affirmative if any terminal responded, negative otherwise;

e) having said controller store in said polled for digit of said work area representing said selected address said preferred value if said single combined response code is affirmative, the opposite of said preferred value otherwise, this value being called a selected value of the polled for digit;

f) having said controller establish the next digit as the polled for digit and repeating steps b through e with said query poll of step b indicating said selected value of the polled for digit most recently determined in step e, any said eligible terminal becoming ineligible to respond further in said current polling sequence if said eligible terminal does not have said selected value of the polled for digit in said polled for digit most recently determined in step e;

g) repeating step f until each digit of said addresses of said common address length has been polled and said selected values stored in said work area, so a complete address is stored in said work area;

h) having the controller with a query poll indicate said selected value of the polled for digit most recently determined in step e, which is the last digit to be selected;

i) having respond the one terminal still eligible to respond which has in said polled for digit of its address said selected value of the digit most recently determined in step e, this terminal being the single terminal that corresponds to said complete stored address and is therefore notified of its selection by virture of its response, and said complete address identifies said terminal requiring service, otherwise, if there is no response to the poll of step h, no terminal requires service.

2. The method of claim 1 wherein the notification that a polling sequence is beginning in step a is included in the query poll of step b.

3. The method of claim 1 wherein the preferred value of each digit is determined prior to the polling sequence and included in the notification that a polling sequence is beginning in step a instead of in the individual query poll of step b.

4. The method of claim 1 wherein the preferred value of each digit is fixed and contained in each terminal and the controller instead of being included in the individual query poll of step b.

5. THe method of claim 1 wherein predetermined values for specific digits are selected and codified in the notification that a polling sequence is beginning in step a instead of performing steps b through e to determine the values for said specific digits.

6. A polling method for a communication system having a controller and a multiplicity of terminals, each said terminal having a unique binary address code of a common length comprised of at least two bits, and said terminals and controller having the capability of detecting and responding to codes sent from the controller or any of said terminals, said terminal responses comprised of binary codes which, when in response to a specific poll, are observed by said controller and terminals as a single response code, said single response code being equivalent to the result of combining all said responses through logical summing, the objective of said polling method being the selection of the address of a terminal requiring service by storing said selected address in a work area in said controller and having the terminal with said selected address able to determine it has been selected, said controller including means to determine at any stage of the polling process a preferred value of a digit of said selected address, said polling method comprising the steps of:

a) having said controller establish a pointer designating a polled for digit as the first digit of said addresses and having said controller notify each of said terminals that a polling sequence is beginning, each terminal requiring service at the time of the notification of polling sequence start being eligible to respond to future polls of said polling sequence, other terminals being ineligible to respond during said polling sequence;

b) having said controller broadcast at least one query poll to all terminals, said poll corresponding to said polled for digit of the address and said poll identifying said preferred value of said polled for digit;

c) having respond simultaneously each said terminal still eligible to respond which has in said polled for digit of its address said preferred value, these terminals being called responding terminals;

d) having said controller and all said eligible terminals wait for said single combined response code from said responding terminals, said single combined response code being affirmative if any terminal responded, negative otherwise;

e) having said controller store in said polled for digit of said selected address stored in said work area said preferred value if said single combined response code is affirmative, the opposite of said preferred value otherwise, this value being called a selected value of the polled for digit;

f) having each said eligible terminal becoming ineligible to respond further in said current polling sequence if said eligible terminal does not have said preferred value in said polled for digit of the prior poll in said unique binary address code of said eligible terminal if said single combined response code is affirmative;

g) having said controller establish the next digit as the polled for digit and repeating steps b through f;

h) repeating step g until each digit of said addresses of said common address length has been polled and said selected values stored in said work area, so a complete address is stored in said work area;

i) having respond the terminal still eligible to respond this terminal being the single terminal that corresponds to said complete stored address and is therefore notified of its selection by virtue of its eligibility at the conclusion of step h, otherwise, if there is no response no terminal requires service.

7. The method of claim 6 wherein the notification that a polling sequence is beginning in step a is included in the query poll of step b.

8. The method of claim 6 wherein the preferred value of each digit is determined prior to the polling sequence and included in the notification that a polling sequence is beginning in step a instead of in the individual query poll of step b.

9. The method of claim 6 wherein the preferred value of each digit is fixed and contained in each terminal and the controller instead of being included in the individual query poll of step b.

10. The method of claim 9 wherein the query poll of step b consists of a single bit.

11. The method of claim 6 wherein predetermined values for specific digits are selected and codified in the notification that a polling sequence is beginning in step a instead of determining the values for said specific digits in steps b through e.

12. The method of claim 11 wherein the query poll of step b consists of a single bit.

13. A polling method for a communication system comprised of a controller and a multiplicity of terminals, each said terminal having a unique address code of a common length of at least two digits, said digits being expressed in a radix, called the address radix, and said terminals having the means of detecting and responding to codes sent from said controller, said terminal responses being binary codes consisting of a number of bits equal to the address radix number, only one which is a 1, which are observed by said controller as a combined multiple response code consisting of the address radix number of bits, said combined multiple response code being equivalent to the result of combining all said terminal response codes through a bit wise logical summing, the objective of said polling method being the determination and storage of the addresses of every terminal requiring service at the start of an application of said polling method, by storing the selected addresses in a selected terminal queue work area in said controller, said polling method comprising the steps of:

a) having said controller initialize a cell indicating a polled for digit, said polled for digit initially being digit 0, and having said controller initialize a cell indicating a designated digit value, its initial value unimportant;

b) having said controller broadcast a poll frame to all said terminals which indicates to said terminals said polled for digit and said designated digit value;

c) if said polled or digit of step b is 0, having each terminal requiring service at the time of the broadcast of said poll frame respond by sending a response code consisting of a 1 in the bit of the response code corresponding to the value of the first digit of the terminal's address code, each said terminal marking itself as matching through said polled for digit 0;

d) if said polled for digit of step b is greater than 0, having each terminal which has marked itself matching through the previous polled for digit and which also in the current polled for digit of its address matches said designated digit value, mark itself as matching through the current polled for digit, and send a response code consisting of a 1 in the bit of said response code corresponding to the value of the next digit of the terminal's address;

e) having said controller wait for said combined multiple response code;

f) for each bit of said combined multiple response code which is 1, having said controller push a pair of values on a work stack, said pair of values consisting of the number of the response code bit which is 1, and said polled for digit plus 1;

g) if said work stack is empty, having said controller proceed back to step a, otherwise having the controller remove a pair of values from said work stack, these becoming the new said polled for digit and said designated digit value;

h) having said controller store into a work area containing a partially selected address said designated value in the digit of the selected address indicated by the polled for digit;

i) if said selected address is complete, having the controller put said selected address on said selected terminal queue work area and proceeding to step g, otherwise, proceeding to step b.

14. The method of claim 13 wherein said combined multiple response code is obtained by transmitting each bit of said terminal response codes on a separate channel.

15. The method of claim 13 wherein said combined multiple response code is obtained by having each responding terminal send its single bit response with a delay appropriate to have said bit logically summed into the appropriate bit of the single combined response code.

16. The method of claim 15 wherein said delay is determined through an initial calibration session between said controller and each of said terminals individually, wherein said controller determines the natural delay of the terminal being calibrated and sends it a compensating additional delay which, when added to the natural delay, results in a delay which is the maximum acceptable delay for any terminal, thus aligning the response of every terminal to the same delay as viewed from said controller, said terminals then always delaying the compensating interval plus any required delay to place a response bit in the appropriate bit of said combined multiple response code.

17. The method of claim 13 wherein said combined multiple response code is obtained by having said controller issue a bit designating poll frame prior to transmission of each bit of said combined multiple response code 18. The method of claim 17 wherein said bit designating poll frame consists of a single bit.

* * * * *